United States Patent
Ferrante et al.

(10) Patent No.: US 10,756,796 B2
(45) Date of Patent: Aug. 25, 2020

(54) SYSTEM AND METHOD FOR ADVANCED SPATIAL MODULATION IN 5G SYSTEMS

(71) Applicant: IDAC Holdings, Inc., Wilmington, DE (US)

(72) Inventors: Steven Ferrante, Doylestown, PA (US); Fengjun Xi, San Diego, CA (US); Rui Yang, Greenlawn, NY (US); Chunxuan Ye, San Diego, CA (US); Kyle Jung-Lin Pan, Saint James, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 86 days.

(21) Appl. No.: 16/088,363

(22) PCT Filed: Mar. 29, 2017

(86) PCT No.: PCT/US2017/024845
§ 371 (c)(1),
(2) Date: Sep. 25, 2018

(87) PCT Pub. No.: WO2017/172983
PCT Pub. Date: Oct. 5, 2017

(65) Prior Publication Data
US 2020/0145069 A1  May 7, 2020

Related U.S. Application Data

(60) Provisional application No. 62/315,606, filed on Mar. 30, 2016.

(51) Int. Cl.
*H04B 7/06* (2006.01)
*H04B 7/0456* (2017.01)
*H04B 7/10* (2017.01)

(52) U.S. Cl.
CPC ......... *H04B 7/0608* (2013.01); *H04B 7/0473* (2013.01); *H04B 7/0626* (2013.01); *H04B 7/10* (2013.01)

(58) Field of Classification Search
CPC ...... H04B 7/0608; H04B 7/0626; H04B 7/10; H04B 7/0473
See application file for complete search history.

(56) References Cited

U.S. PATENT DOCUMENTS

| | | |
|---|---|---|
| 7,668,075 B2 | 2/2010 | Hosur |
| 2007/0211786 A1 | 9/2007 | Shattil |

(Continued)

FOREIGN PATENT DOCUMENTS

| | | |
|---|---|---|
| WO | 2008045001 | 4/2009 |
| WO | 2015113603 | 8/2015 |
| WO | 2015113603 A1 | 8/2015 |

OTHER PUBLICATIONS

Christodoulou, C. G., et. al., "Reconfigurable Antennas for Wireless and Space Applications". Proceedings of the IEEE, vol. 100, No. 7, (2012), pp. 2250-2261.

(Continued)

*Primary Examiner* — Mohammad S Anwar
(74) *Attorney, Agent, or Firm* — Invention Mine LLC

(57) ABSTRACT

Systems and methods described herein are provided for radiation pattern and modulation (RPM) based on channel-state information (CSI). The method may comprise receiving a set of bits; dividing the set of bits into at least three groups, wherein at least one group is size limited by a diversity order and selection factor applied by a CSI controller; mapping the groups to distinct control signals; generating a modulated RF signal and selecting at least one configurable antenna and a configuration of said at least one antenna based on the control signals; and transmitting the (Continued)

modulated RF signal through the at least one configured antenna.

14 Claims, 15 Drawing Sheets

(56) References Cited

U.S. PATENT DOCUMENTS

| | | |
|---|---|---|
| 2008/0170533 A1 | 7/2008 | Cyzs |
| 2009/0110033 A1 | 4/2009 | Shattil |
| 2011/0274429 A1* | 11/2011 | Caplan ............... E21B 49/00 398/65 |
| 2013/0287133 A1 | 10/2013 | Coon |
| 2014/0206291 A1 | 7/2014 | Ichikawa |
| 2014/0247748 A1* | 9/2014 | Kang ............... H04L 5/0023 370/252 |
| 2015/0207551 A1 | 7/2015 | Kang |
| 2015/0214633 A1 | 7/2015 | Pan |
| 2016/0134024 A1 | 5/2016 | Noh |
| 2016/0134408 A1* | 5/2016 | Kim ............... H04B 7/0626 370/329 |
| 2016/0337012 A1 | 11/2016 | Kimura |
| 2017/0033847 A1 | 2/2017 | Lomayev |
| 2017/0054482 A1 | 2/2017 | Forenza |
| 2017/0054583 A1* | 2/2017 | Pratt ............... H04L 25/0228 |
| 2017/0070280 A1 | 3/2017 | Henarejos |
| 2017/0212210 A1* | 7/2017 | Chen ............... G01S 5/06 |
| 2018/0241476 A1 | 8/2018 | Johnson |

OTHER PUBLICATIONS

Wengerter, C., "Advanced Hybrid ARQ Technique Employing a Signal Constellation Rearrangement". Proceedings IEEE 56th Vehicular Technology Conference, vol. 4, (2002), pp. 2002-2006.

International Search Report and the Written Opinion of the International Searching Authority for PCT/US2017/024845 dated Jun. 2, 2017, 15 pages.

Internatioanl Preliminary Report on Patentability for PCT/US2017/024845 completed on Mar. 27, 2018.

Itu, "IMT Vision—Framework and Overall Objectives of The Future Development of IMT for 2020 and Beyond". International Telecommunication Union, ITU-R Recommendation M.2083, M Series, Sep. 2015, 21 pages.

NGMN Alliance, "5G White Paper". Next Generation Mobile Networks (NGMN), Version 1.0, Feb. 2015, 125 pages.

Invitation to Pay additional fees and, where applicable, protest fee for PCT/US2017/024848 mailed on Jul. 5, 2017, 15 pages.

R Ramirez-Gutierrez et al: "Antenna pattern shift keying modulation for MIMO channels", Aug. 20, 2013 (Aug. 20, 2013), XP055384568, Wireless Conference (EW), Proceedings of the 2013 19th European Retrieved from URL: http://ieeexplore.ieee.org/ielx7/6582749/6582750/06582818.pdf?tp=&arnumber=6582818&isnumber=6582750, [retrieved on Jun. 23, 2017].

International Search Report and the Written Opinion of the International Searching Authority for PCT/US2017/024848 dated Aug. 29, 2017, 19 pages.

International Preliminary Report on Patentability for PCT/US2017/024848 dated Oct. 11, 2018.

Samsung, "Vision and Schedule For 5G Radio Technologies". 3GPP RAN Workshop on 5G Presentation, RWS-150039, Sep. 2015, 19 pages.

Ramirez-Gutierrez, Raymundo, et. al., "Antenna Pattern Shift Keying Modulation for MIMO Channels". European Wireless, ISBN: 978-3-8007-3498-6, Apr. 16-18, 2013, pp. 1-5.

Park, Jangyong, et. al., "An Enhanced Dual Carrier Modulation for Performance Improvement in WiMedia UWB Systems". IEEE Transactions on Consumer Electronics, vol. 57, No. 4, Nov. 2011, pp. 1556-1563.

* cited by examiner

Reconfigurable Alford Loop

Pattern and Polarization
Reconfigurable Circular Patch

Reconfigurable Dipole

SYSTEM AND METHOD FOR ADVANCED SPATIAL MODULATION IN 5G SYSTEMS

CROSS-REFERENCE TO RELATED APPLICATIONS

The present application is a national stage application under 35 U.S.C. 371 of International Application No. PCT/US2017/024845, entitled SYSTEM AND METHOD FOR ADVANCED SPATIAL MODULATION IN 5G SYSTEMS, filed on Mar. 29, 2017, which claims benefit under 35 U.S.C. § 119(e) from, U.S. Provisional Patent Application Ser. No. 62/315,606, filed Mar. 30, 2016, entitled "SYSTEM AND METHOD FOR ADVANCED SPATIAL MODULATION IN 5G SYSTEMS", hereby incorporated by reference in its entirety.

TECHNICAL FIELD

This disclosure relates to systems and methods for beamforming training in wireless communications, such as wireless local area networks (WLANs), such as Institute of Electrical and Electronics Engineers (IEEE) 802.11ay WLANs.

BACKGROUND

The throughput of wireless communication systems has increased significantly by new technologies introduced in LTE and Wi-Fi. These technologies, however, are not sufficient to meet the demands of future applications which will require Gbits/sec of throughput and latencies of 1 ms. Therefore, research on a new radio access technology, known as the 5G, has already started. As the applications and ubiquity of cellular communication systems grow, they are expected to support new features, and meet a more stringent set of performance requirements. Based on the general requirements set out by ITU-R (as discussed in ITU-R Recommendation M.2083, "IMT vision—framework and overall objectives of the future development of IMT for 2020 and beyond," 2015), NGMN (as discussed in NGMN Alliance, "5G white paper," 2015), and 3GPP, a broad classification of the use cases for emerging 5G systems can be depicted as follows: Enhanced Mobile Broadband (eMBB), Massive Machine Type Communications (mMTC) and Ultra Reliable and Low latency Communications (URLLC). Different use cases may focus on different requirements such as higher data rate, higher spectral efficiency, low power and higher energy efficiency, lower latency and higher reliability.

Massive machine type communication (mMTC) is one of the three main use case categories for the fifth-generation cellular standards (5G). The mMTC use case is characterized by the desire to provide connectivity for a very large number of low cost devices. Target applications include things such as smart metering, home appliances, and remote sensors. Common to all of these applications is that the data transmissions are relatively small and infrequent. One of the requirements to make these massive deployments feasible will be the ability to use low cost devices with significantly extended battery life.

As compared to conventional multiple-input and multiple-output (MIMO), spatial modulation MIMO (SM-MIMO) is a modulation technique that modulates information onto the antenna indices at the transmitter allowing the number of radio frequency (RF) chains to be less than the number of transmit antennas, thus reducing overall cost and power consumption. Therefore, SM-MIMO primarily targets energy efficiency (EE) over spectral efficiency (SE).

Link adaptation is a widely used technique whereby certain transmit parameters are dynamically configured, based on channel conditions, in order to optimize certain link criteria. Adaptive modulation and coding (AMC) is one common link adaptation scheme that adjusts the modulation and coding scheme based on the current channel conditions and a desired error probability so that the spectral efficiency (SE) is maximized. Multiple input multiple output (MIMO) technology also primarily targets higher SE. Spatial multiplexing (SMX) is a MIMO technique which allows for multiple simultaneous data streams to be transmitted and received over the same radio channel. For this technique to be successful certain channel conditions should be satisfied, hence link adaptation can also be applied by dynamically adjusting the SMX mode based on the current channel conditions so as to maximize the SE.

To summarize, SM-MIMO is a powerful communication technique that primarily targets low cost devices and energy efficient operation. Furthermore, link adaptation is a similarly powerful technique that is used to increase SE based on the changing channel conditions these systems will inevitably encounter.

Electrically reconfigurable antennas are capable of dynamically reshaping themselves and thereby changing their radiation characteristics. This dynamic reshaping can be realized by integrating PIN/varactor diodes and/or MEMS devices into the structure of the antenna, and further electrically controlling these components. Sample reconfigurable antennas are shown in FIG. 2. Reconfigurable antennas can be classified into four different categories (as discussed in C. G. Christodoulou, Y. Tawk, S. A. Lane, and S. R. Erwin, "Reconfigurable antennas for wireless and space applications," Proceedings of the IEEE, vol. 100, no. 7, pp. 2250-2261, 2012). A frequency reconfigurable antenna is a radiating structure that is able to change its operating or notch frequency by hopping between different frequency bands. This is achieved by producing some tuning or notch in the antenna reflection coefficient. A radiation pattern reconfigurable antenna is able to tune its radiation pattern in terms of shape, direction, or gain. A polarization reconfigurable antenna is a radiating structure that can change its polarization (horizontal/vertical, _slant 45_, left-hand or right-hand circular polarized, etc.) Such an antenna can change, for example, from vertical to left-hand circular polarization. A further category is a combination of the previous three categories. For example, one can achieve a frequency reconfigurable antenna with polarization diversity at the same time.

SUMMARY

Maximizing spectral efficiency (SE) has historically been the main driver for technology development, while little attention has been paid to energy efficiency (EE). While conventional MIMO technology is recently responsible for some of the substantial increases in SE, it does so at the cost of increased circuit power dissipation at the transmitter as well as increased signal processing complexity at the receiver. SM-MIMO, while providing smaller increases in SE compared to conventional MIMO, can provide substantial gains in EE. Improved SM-MIMO systems and methods are proposed to strike a better balance between SE and EE than conventional MIMO techniques currently offer.

The ability to use low cost devices with significantly extended battery life is expected to enhance the feasibility of mMTC deployments. While most current mMTC applications have relatively low data rate requirements, newer applications may have increased data rate requirements. Nevertheless, because of the large number of devices deployed for all of these applications, low cost devices with extended battery life will surely continue to be desirable. Designing systems using low cost devices that can further strike the proper balance between EE and SE in operational mode is expected to enhance the feasibility of the mMTC use case for 5G.

Note that 5G may be interchangeably used with New Radio or New Radio Access or New Radio interface in the present disclosure.

The feasibility of the mMTC use case benefits from the ability to design systems that strike the proper balance between having the ability to provide the desired SE while simultaneously using low cost devices that are extremely energy efficient. The SM-MIMO concept can be leveraged for its low cost device architectures and energy efficient operation, while additional antenna-based modulation and link adaptation techniques can be utilized to improve the SE of the channel. Especially where higher frequency and wider bandwidth operation is desirable, it is advantageous to improve the balance of SE and EE. Specifically, the following problems are addressed by systems and methods disclosed herein.

CSI Based Modulation Schemes with RPM.

While radiation pattern and/or polarization modulation (RPM) provides one more degree to bear information bits, diversity gain may be also desired for reliable communication when increasing the spectral efficiency for various 5G scenarios. Therefore, the design of efficient modulation schemes based on channel-state information (CSI) with RPM is addressed to provide a better tradeoff between diversity gain and spectral efficiency.

Controlled Joint Modulation with Dynamic Configuration.

In order to allow for a wide range of configurability for the dynamic goals of current applications as well as the potential future needs of applications for 5G communication systems, a form of link adaptation that considers EE and/or SE and/or other metrics (e.g., reliability and latency) as an optimizing criteria and allows for the configuration of a variety of modulation formats, such as signal amplitude, spatial, polarization, etc., is useful. How to extend the traditional link adaptation schemes, and further extend the EE concept by using energy harvesting techniques for the unused resources are other topics addressed herein.

BRIEF DESCRIPTION OF THE DRAWINGS

A more detailed understanding may be had from the following description, presented by way of example in conjunction with the accompanying drawings.

DETAILED DESCRIPTION

Network Architecture.

Figure 1A:
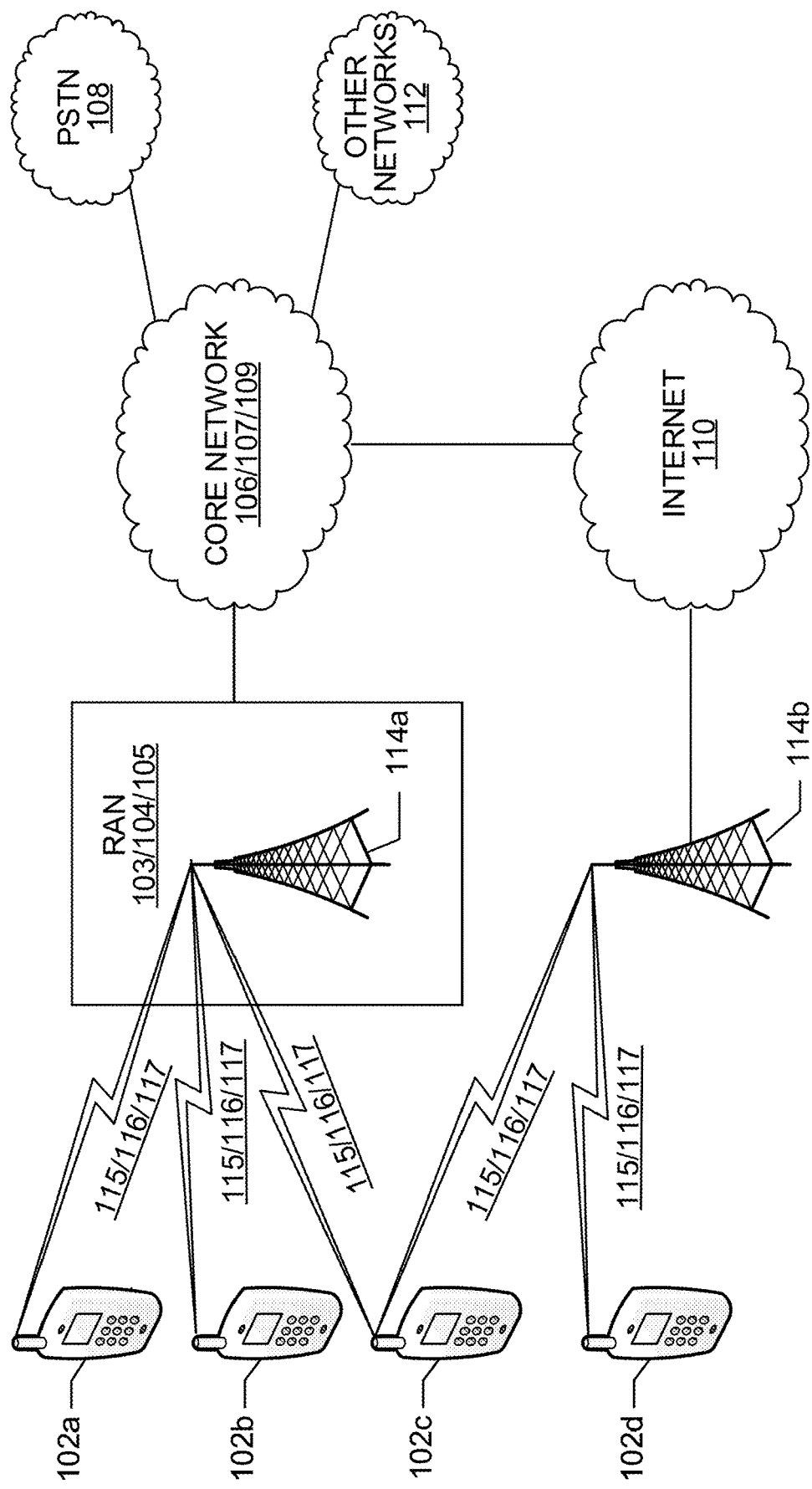
FIG. 1A depicts an example communications system in which one or more disclosed embodiments may be implemented.

The systems and methods relating multicast group formation may be used with the wireless communication systems described with respect to FIGS. 1A-1F. As an initial matter, these wireless systems will be described. FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
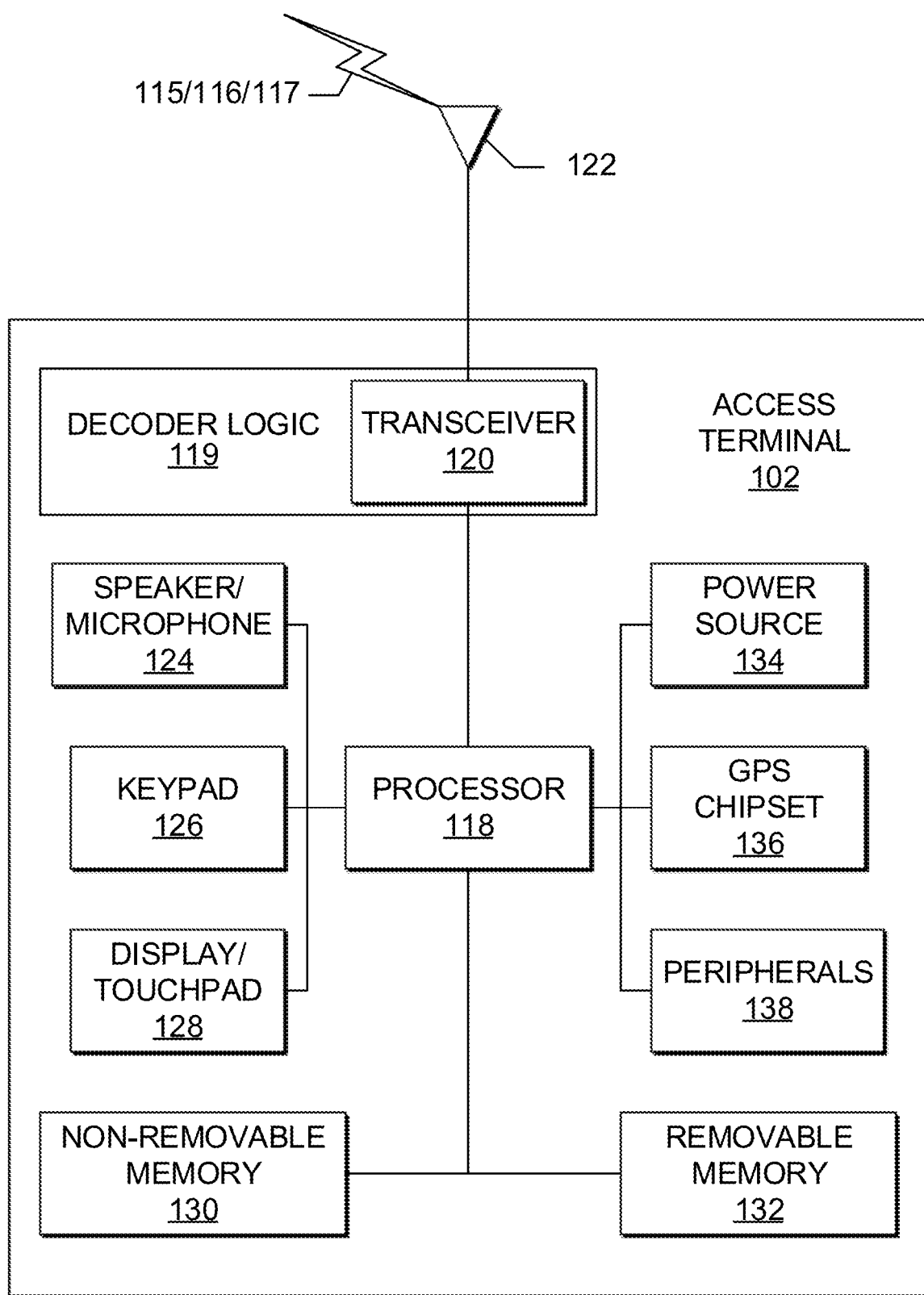
FIG. 1B depicts an example wireless transmit/receive unit (WTRU) that may be used within the communications system of FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 can be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
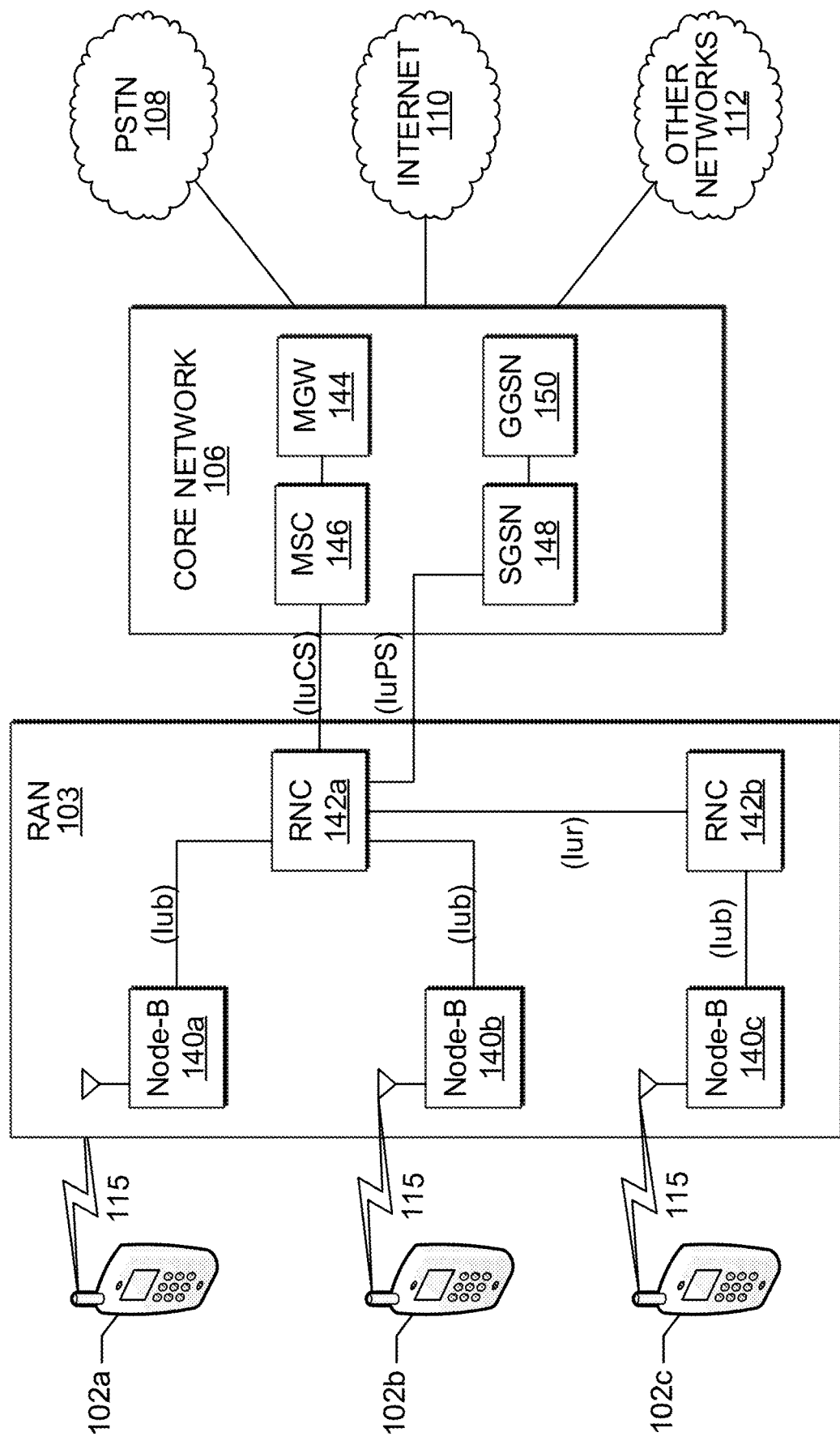
FIG. 1C depicts an example radio access network (RAN) and an example core network that may be used within the communications system of FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer-loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired and/or wireless networks that are owned and/or operated by other service providers.

Figure 1D:
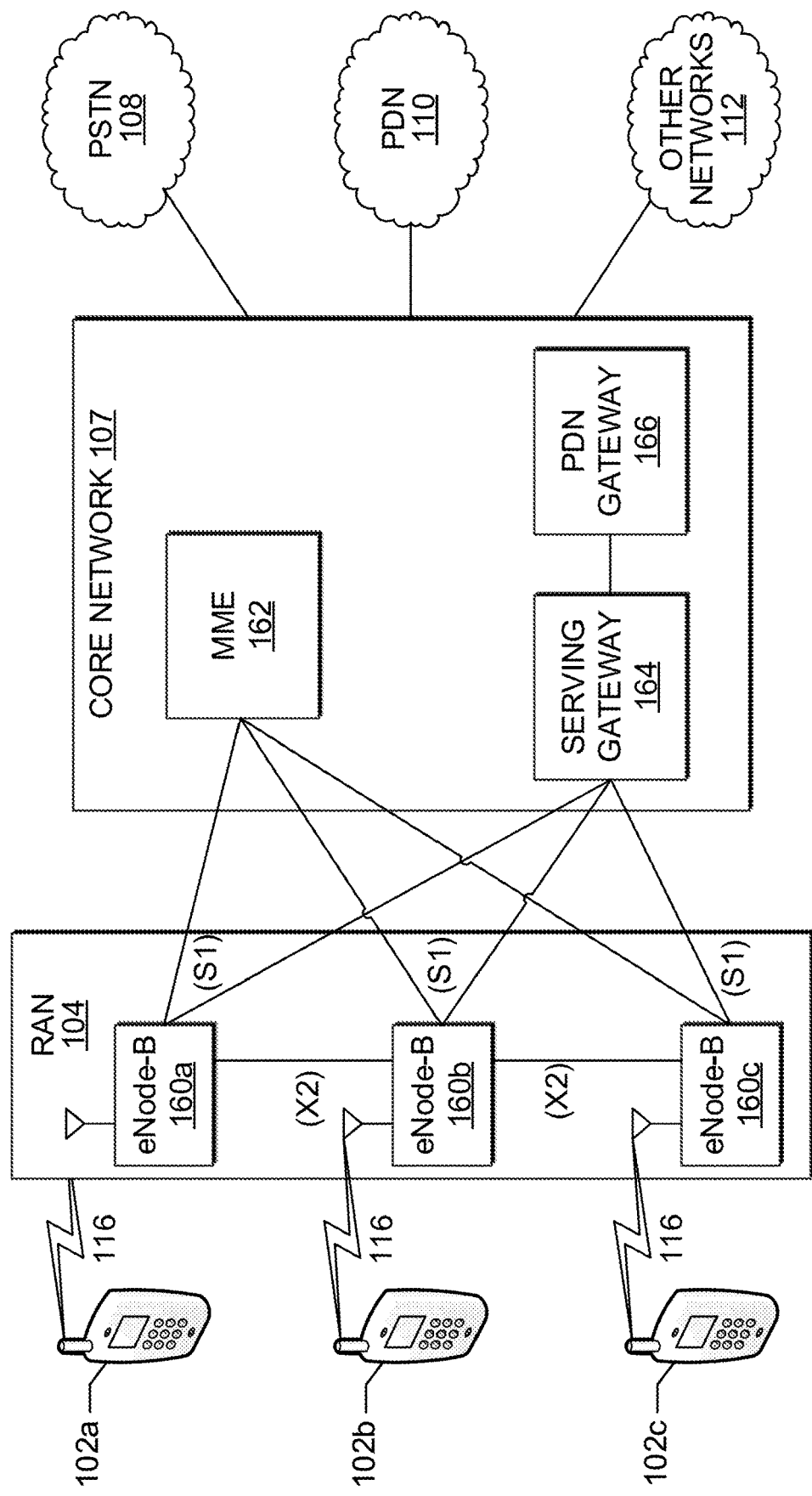
FIG. 1D depicts a second example RAN and a second example core network that may be used within the communications system of FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio-resource-management decisions, handover decisions, scheduling of users in the uplink and/or downlink, and the like. As shown in FIG. 1D, the eNode Bs 160a, 160b, 160c may communicate with one another over an X2 interface.

The core network 107 shown in FIG. 1D may include a mobility management entity (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired and/or wireless networks that are owned and/or operated by other service providers.

Figure 1E:
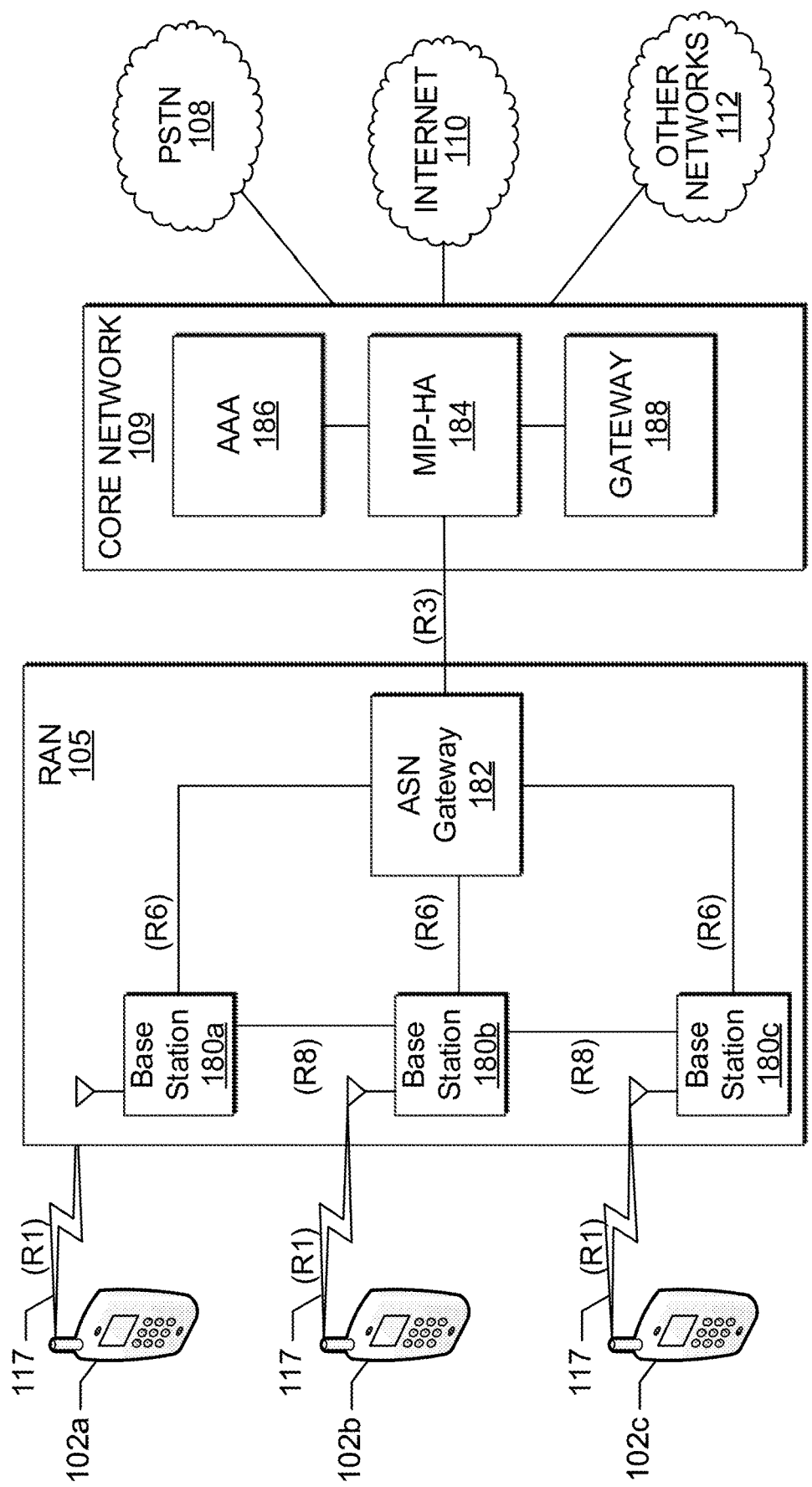
FIG. 1E depicts a third example RAN and a third example core network that may be used within the communications system of FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility-management functions, such as handoff triggering, tunnel establishment, radio-resource management, traffic classification, quality-of-service (QoS) policy enforcement, and the like.

The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP-host-configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA 184 may be responsible for IP-address management, and may enable the WTRUs 102a, 102b, 102c to roam between different ASNs and/or different core networks. The MW-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 1F:
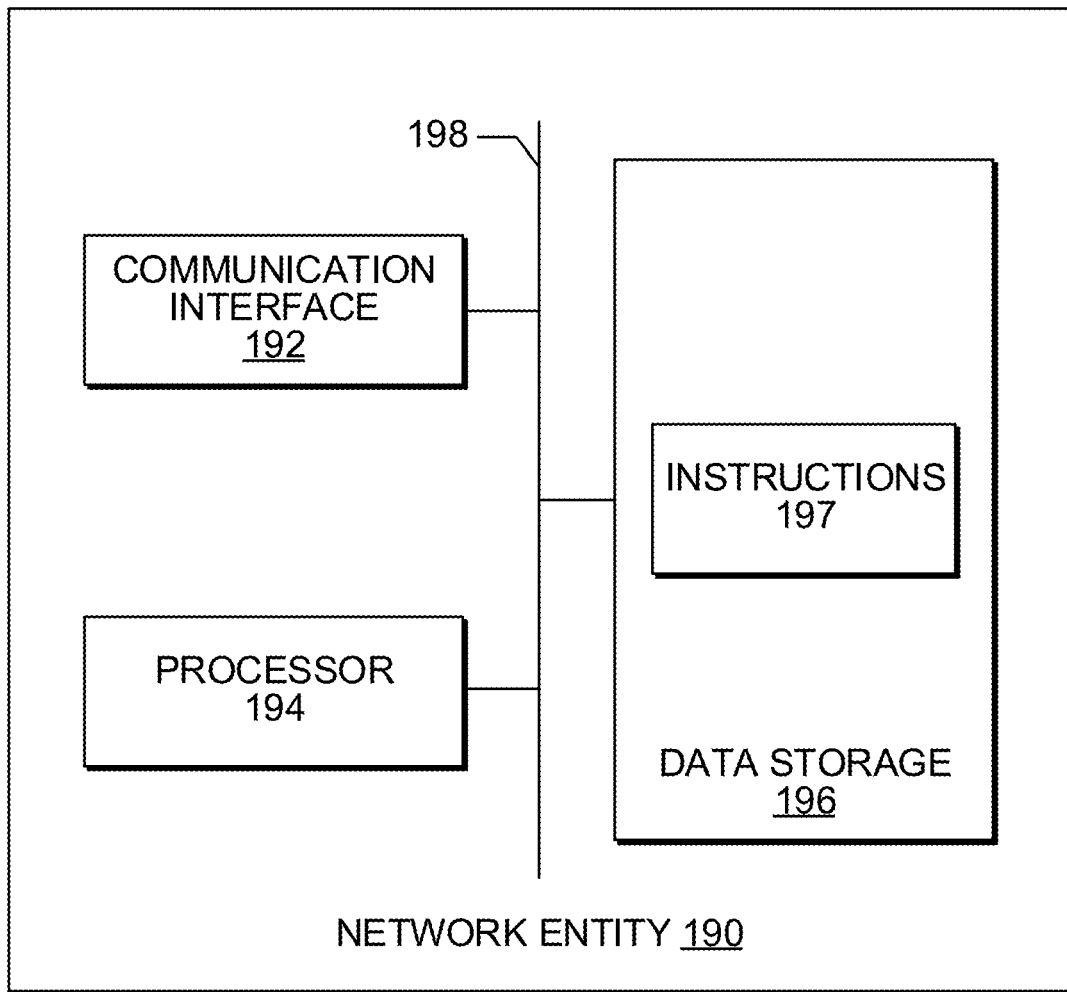
FIG. 1F depicts an exemplary network entity that may be used within the communication system of FIG. 1A.
Figure 2:
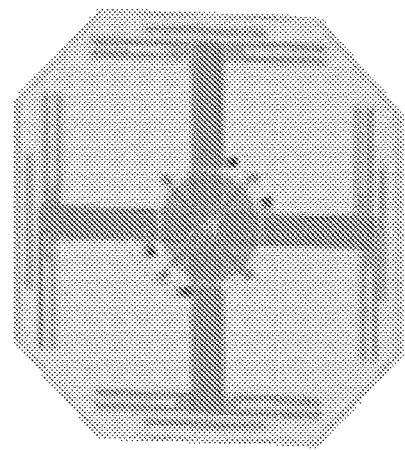
FIG. 2 illustrates exemplary reconfigurable antennas.
Figure 2:
Figure 2:
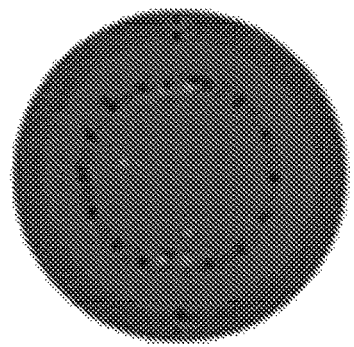
Figure 2:
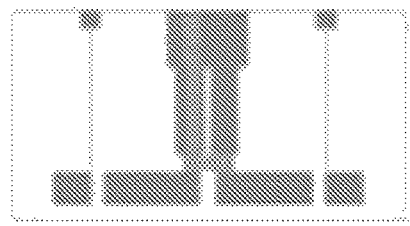
Figure 2:
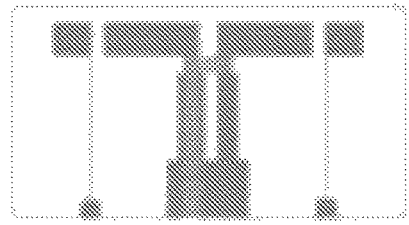

FIG. 1F depicts an example network entity 190 that may be used within the communication system 100 of FIG. 1A.

As depicted in FIG. 1F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1F. In some embodiments, one or more of such functions are carried out by a set of multiple network entities in combination, where each network entity has a structure similar to that of network entity 190 of FIG. 1F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node-B 140a, Node-B 140b, Node-B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MW-HA 184, AAA 186, and gateway 188. And certainly other network entities and/or combinations of network entities could be used in various embodiments for carrying out the network-entity functions described herein, as the foregoing list is provided by way of example and not by way of limitation.

Abbreviations Used in Disclosure

The following list includes abbreviations used in the present disclosure.

SE: Spectral Efficiency, which may be measured in BPCU (bits per channel use).

EE: Energy Efficiency.

APM: Amplitude and/or Phase Modulation. Any modulation technique that changes the amplitude, phase, or a combination of a baseline modulating signal as a means of transmitting information, e.g., ASK, PSK, QAM, etc.

RPM: Radiation Pattern/Polarization Modulation. A modulation technique that modulates information onto the different radiation patterns and/or polarization modes of an antenna.

RPD: Radiation Pattern/Polarization Diversity. A diversity scheme that uses different radiation patterns and/or polarization modes of an antenna to improve the quality of a wireless link.

Channel Use: An information theoretic based term that represents the time required for a symbol to be transmitted.

BPCU: Bits per Channel Use. Units for measurement of spectral efficiency.

SSK: Space Shift Keying. A modulation technique that conveys information by activating one of many transmit antennas per channel use. The transmitted signal from each antenna will carry a unique spatial signature that can be decoded at the receiver, thereby constituting a transfer of information.

GSSK: Generalized Space Shift Keying. A modulation technique similar to SSK, except that more than one antenna is active for each channel use.

SM: Spatial Modulation. Combines SSK with signal space modulation. In this case the active antenna may additionally transmit a modulation symbol, (e.g., BPSK, QPSK, etc.). Only one Tx RF chain is used.

GSM: Generalized Spatial Modulation. An extension of SM that is similar to the extension of SSK to GSSK. The difference is that in this case each antenna may carry a different modulation symbol if more than one Tx RF chain is allowed.

CSI: Channel State Information. Information that is used to define the propagation channel. In the most general sense this can be the channel transfer function.

ML: Maximum Likelihood. A common criterion used to design receiver structures.

MMSE: Minimum Mean Squared Error. A common criterion used to design receiver structures.

STBC: Space Time Block Coding. A Time and Space Transmit Diversity Technique.

SFBC: Space Frequency Block Coding. A Frequency and Space Transmit Diversity Technique.

FSK: Frequency Shift Keying. A modulation technique that conveys information by activating one of many frequency regions.

GFSK: Generalized Frequency Shift Keying. A modulation technique similar to FSK, except that more than one frequency region may be active for each channel use.

FAPM: Frequency Amplitude and/or Phase Modulation: Combines FSK with signal space modulation. In this case the active frequency region may additionally be used to transmit a modulation symbol, (e.g., BPSK, QPSK, M-QAM, etc.).

GFAPM: Generalized Frequency Amplitude and/or Phase Modulation. Similar extension as was FSK to GFSK.

SMX: Spatial Multiplexing. A MIMO technique used to increase SE.

$\lfloor x \rfloor_{2^\beta}$: The largest integer less than or equal to x that is an integer power of two.

$\binom{n}{k}$: "n choose k" $\frac{n!}{k!(n-k)!}$

Note that 5G may be interchangeably used with New Radio or New Radio Access or New radio interface in the present disclosure.

CSI-Based Modulations with RPM.

Some of the embodiments descried herein relate to efficient modulation schemes based on channel-state information (CSI) with radiation pattern and/or polarization modulation (RPM). The dimensions used to bear information can also be used to provide CSI-based diversity gains. CSI-based modulation schemes with RPM are proposed to achieve high diversity gain for reliable communication while maintaining a spectral efficiency.

Instead of using all antenna indices, subcarrier indices and/or radiation patterns and/or polarizations to bear information bits, in exemplary embodiments a selection is made of which (or which group of) antenna(s), subcarrier(s) and/or radiation pattern(s)/polarization(s) to use based on CSI, and then a selected (or group of) antenna(s) and/or subcarrier(s) and/or radiation pattern(s)/polarization(s) may be used to transmit the information bits. By doing so, a form of selection combining diversity gain is provided and thus leads to optimal communication based on certain criteria.

1. Combined Single RF Chain GSM with CSI-Based RPM

Figure 3:
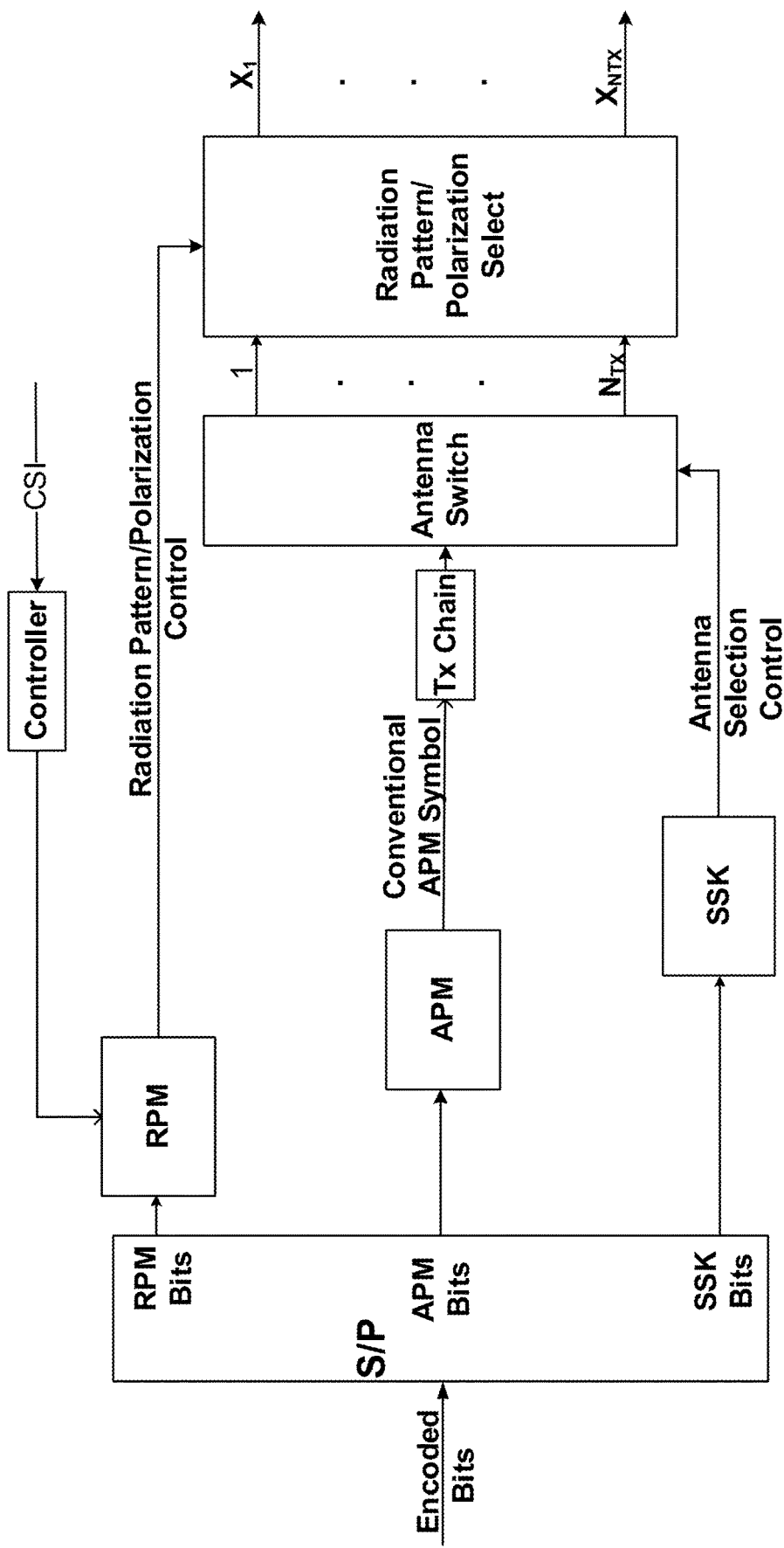
FIG. 3 is a functional block diagram of a transmitter using combined GSM with CSI-based RPM.

In an exemplary embodiment, of a CSI-based multi-dimensional modulation scheme, information bits are transmitted by using the Combined Single RF chain GSM with CSI-based RPM as shown in the example of FIG. 3.

An exemplary transmitter procedure per channel use may include one or any combination of the following steps. A set of encoded bits may first be divided into three groups of varying size. A first group is an APM Group. The number of bits in the APM group may depend on the conventional signal space modulation order. E.g., QPSK: $M_{APM}=4$. A second group is an SSK Group. The number of bits in the SSK group may depend on the total number of transmit antennas, $N_{Tx}$. A third group is an RPM Group. The number of bits in the RPM group may depend on the number of "effective" radiation patterns and/or polarization modes, $N_{RP\_eff}$, after a desired diversity order, $N_{div}$, and selection is done by the controller based on CSI, which can be written as:

$$N_{RP\_eff} = \left\lfloor \frac{N_{RP}}{N_{div}} \right\rfloor_{2^\beta}$$

where $N_{RP}$ is actual number of radiation patterns and/or polarization modes.

Based on CSI, specific radiation pattern and/or polarization may be selected to provide best performance. For example, a reconfigurable antenna may be used with the capability to provide a set of radiation patterns using either vertical or horizontal polarization (one group of patterns for each polarization mode). If at some time instant the horizontal polarization is able to provide better performance than the vertical polarization, the radiation patterns from the horizontal polarization group can be used only for RPM. As an example, if it is assumed that each group is capable of generating two radiation patterns, the following parameters may be used.

$N_{RP}=4$, $N_{div}=2$, resulting in $N_{RP\_eff}=2$.

The APM bits are mapped onto a signal space based modulation format. The SSK bits are mapped to a control signal indicating which set of $N_{TX\_act}$ antennas of the $N_{TX}$ antennas will be active for the current channel use. The RPM bits are mapped to a control signal(s) that select the radiation pattern and/or polarization mode used for the current channel use. (Note that part of the antenna configuration may be used for diversity and is not used to transmit additional information bits.) The conventional APM symbol may be modulated, up converted to the RF domain, and sent through the Tx RF chain. The generated RF signal is mapped onto the active antennas based on the SSK bits. The antennas are configured to radiate the signal based on the RPM and RPD selection from CSI-based controller. A bit mapping example is shown in Table 1.

An exemplary receiver procedure per channel use may include one or any combination of the following steps. After propagating through the channel, the signal will arrive at the receiver carrying the spatial signature from the selected antennas as well as the radiation/polarization pattern(s) used at the transmitter. The signal can be demodulated and, using channel estimation, the bits can be detected based on receiver structures such as the ML or MMSE detectors. With this, the SE can be written as follows:

$$SE = \log_2\left(\left\lfloor\binom{N_{TX}}{N_{TX\_act}}\right\rfloor_{2^\beta}\right) + \log_2(N_{RP\_eff}) + \log_2(M_{APM}) \; bpcu$$

Where, $N_{TX}$ may indicate the total number of transmit antennas.

$N_{TX\_act}$ may indicate the number of active transmit antennas per channel use.

$N_{RP\_eff}$ may indicate the number of effective radiation patterns/polarization modes available for information bearing from each antenna.

$M_{APM}$ may indicate the conventional signal space modulation order.

TABLE 1

Mapping Example ($N_{TX}$ = 2, $N_{Tx\_act}$ = 1, $N_{div}$ = 2, $N_{RP}$ = 4, $N_{RP\_eff}$ = 2, $M_{APM}$ = 2)

| SSK Bits: [$b_1$] | RPM Bits: [$b_2$] | APM Bits [$b_3$] (BPSK) | CSI-based 2 group RDP Selection, [g] | X = [$x_1$, $x_2$] |
|---|---|---|---|---|
| [0] | [0] | [0] | [1] | [$p_{1,1}e^{j0}$, 0] |
| [0] | [0] | [1] | [1] | [$p_{1,1}e^{j\pi}$, 0] |
| [0] | [1] | [0] | [1] | [$p_{2,1}e^{j0}$, 0] |
| [0] | [1] | [1] | [1] | [$p_{2,1}e^{j\pi}$, 0] |
| [1] | [0] | [0] | [1] | [0, $p_{1,1}e^{j0}$] |
| [1] | [0] | [1] | [1] | [0, $p_{1,1}e^{j\pi}$] |
| [1] | [1] | [0] | [1] | [0, $p_{2,1}e^{j0}$] |
| [1] | [1] | [1] | [1] | [0, $p_{2,1}e^{j\pi}$] |
| [0] | [0] | [0] | [2] | [$p_{1,2}e^{j0}$, 0] |
| [0] | [0] | [1] | [2] | [$p_{1,2}e^{j\pi}$, 0] |
| [0] | [1] | [0] | [2] | [$p_{2,2}e^{j0}$, 0] |
| [0] | [1] | [1] | [2] | [$p_{2,2}e^{j\pi}$, 0] |
| [1] | [0] | [0] | [2] | [0, $p_{1,2}e^{j0}$] |
| [1] | [0] | [1] | [2] | [0, $p_{1,2}e^{j\pi}$] |
| [1] | [1] | [0] | [2] | [0, $p_{2,2}e^{j0}$] |
| [1] | [1] | [1] | [2] | [0, $p_{2,2}e^{j\pi}$] |

Note:
$p_{n,m}$ represents the $n^{th}$ radiation pattern/polarization mode from the $m^{th}$ diversity group selected.

2. Combined Single RF Chain GSM with CSI-Based SSK and RPM

Figure 4:
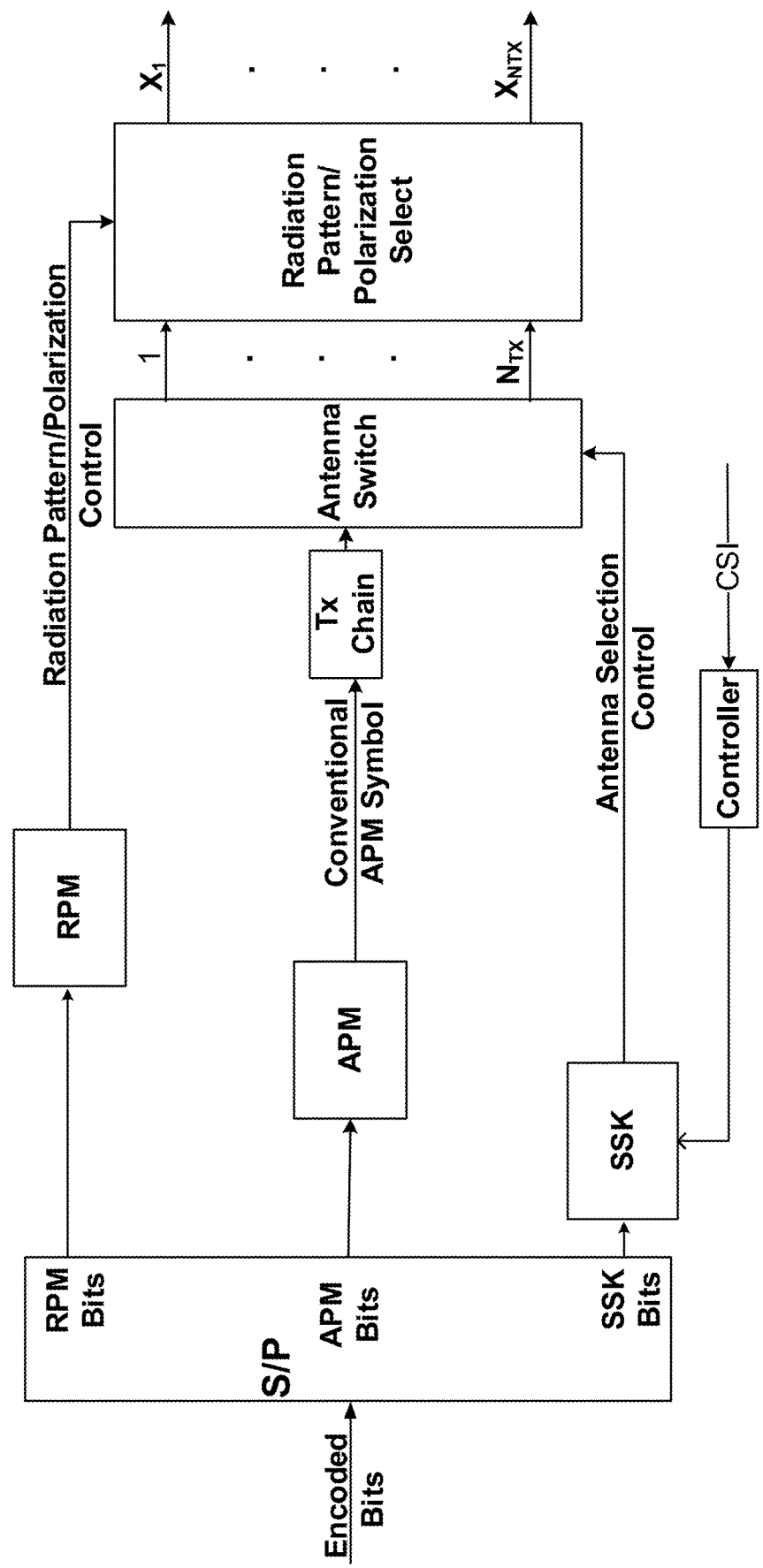
FIG. 4 is a functional block diagram of a transmitter using combined GSM with CSI-based SSK.

In another exemplary embodiment of a system and method for CSI-based modulation, bits may be transmitted using a combined single RF chain GSM with CSI-based SSK and RPM as illustrated in FIG. 4.

A transmitter procedure per channel use may include one or any combination of the following steps. A set of encoded bits may be divided into three groups of varying size. A first group is an APM Group. The number of bits in this APM group may depend on the conventional signal space modulation order. E.g., QPSK: $M_{APM}$=4. A second group is an RPM Group. The number of bits in the RPM Group may depend on the total number of radiation patterns and/or polarization modes, $N_{RP}$. A third group is an SSK Group. The number of bits in the SSK Group may depend on the number of "effective" antennas after a desired diversity order and selection is done by the controller based on CSI, which may be written as:

$$N_{TX\_eff} = \left\lfloor\frac{N_{TX}}{N_{div}}\right\rfloor_{2^\beta}$$

Based on CSI, a specific set of antennas may be selected to provide best performance. For example, a total of eight antennas may be used, but the controller may be allowed, based on CSI, to select the 'best' four for any given time instant. For this example, the following parameters may be used.

$N_{TX}$=8, $N_{div}$=2, resulting in $N_{TX\_eff}$=4.

The APM bits may be mapped onto a signal space based modulation format. The SSK bits are mapped to a control signal indicating which set of antennas will be active for the current channel use. (Note that part of the antenna configuration may be used for diversity and is not used to transmit additional information bits.) The RPM bits may be mapped to a control signal(s) that selects the radiation pattern and/or polarization mode used for the current channel use. The conventional APM symbol may be modulated, up converted to the RF domain and sent through the Tx RF chain. The generated RF signal is mapped onto the active antenna(s) based on the antenna selection control information which is generated by the controller based on CSI. This antenna is configured to radiate the signal based on the RPM bits. A bit mapping example is shown in Table 2.

An exemplary receiver procedure per channel use may include one or any combination of the following steps. After propagating through the channel, the signal arrives at the receiver carrying a unique spatial signature based on the selected antennas and radiation pattern used at the transmitter. The signal may be demodulated and, using channel estimation, may be detected based on receiver structures such as the ML or MMSE detectors. The SE can be written as follows:

$$SE = \log_2\left(\left\lfloor\binom{N_{TX\_eff}}{N_{TX\_act}}\right\rfloor_{2^\beta}\right) + \log_2(N_{RP}) + \log_2(M_{APM}) \; bpcu$$

Where, $N_{TX\_eff}$ may indicate the "effective" number of transmit antennas available for information bearing.

$N_{TX\_act}$ may indicate the number of active transmit antennas per channel use.

$N_{RP}$ may indicate the number of radiation patterns/polarization modes available for each antenna.

$M_{APM}$ may indicate the conventional signal space modulation order.

TABLE 2

Mapping Example ($N_{TX} = 4$, $N_{div} = 2$, $N_{TX\_eff} = 2$, $N_{RP} = 2$, $M_{APM} = 2$)

| SSK Bits: [$b_1$] | RPM Bits: [$b_2$] | APM Bits [$b_3$] (BPSK) | CSI-based 2 group Antenna Selection, [g] | $X = [x_1, x_2, x_3, x_4]$ |
|---|---|---|---|---|
| [0] | [0] | [0] | [1] | [$p_1 e^{j0}$, 0, 0, 0] |
| [0] | [0] | [1] | [1] | [$p_1 e^{j\pi}$, 0, 0, 0] |
| [0] | [1] | [0] | [1] | [$p_2 e^{j0}$, 0, 0, 0] |
| [0] | [1] | [1] | [1] | [$p_2 e^{j\pi}$, 0, 0, 0] |
| [1] | [0] | [0] | [1] | [0, $p_1 e^{j0}$, 0, 0] |
| [1] | [0] | [1] | [1] | [0, $p_1 e^{j\pi}$, 0, 0] |
| [1] | [1] | [0] | [1] | [0, $p_2 e^{j0}$, 0, 0] |
| [1] | [1] | [1] | [1] | [0, $p_2 e^{j\pi}$, 0, 0] |
| [0] | [0] | [0] | [2] | [0, 0, $p_1 e^{j0}$, 0] |
| [0] | [0] | [1] | [2] | [0, 0, $p_1 e^{j\pi}$, 0] |
| [0] | [1] | [0] | [2] | [0, 0, $p_2 e^{j0}$, 0] |
| [0] | [1] | [1] | [2] | [0, 0, $p_2 e^{j\pi}$, 0] |
| [1] | [0] | [0] | [2] | [0, 0, 0, $p_1 e^{j0}$] |
| [1] | [0] | [1] | [2] | [0, 0, 0, $p_1 e^{j\pi}$] |
| [1] | [1] | [0] | [2] | [0, 0, 0, $p_2 e^{j0}$] |
| [1] | [1] | [1] | [2] | [0, 0, 0, $p_2 e^{j\pi}$] |

Note:
$p_n$ represents the $n^{th}$ radiation pattern/polarization mode being selected.

3. Combined Single RF Chain GSM, RPM and CSI-Based GFAPM.

Figure 5:
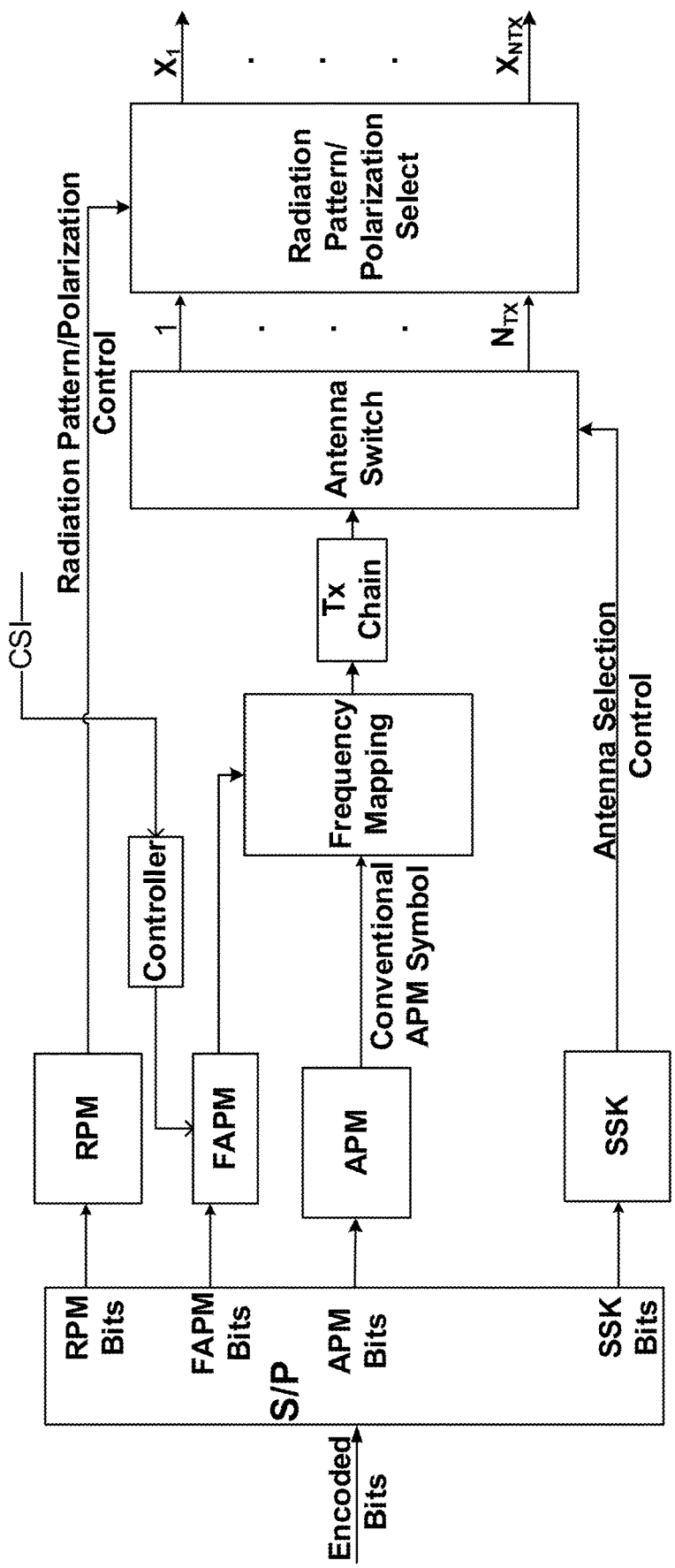
FIG. 5 is a functional block diagram of a transmitter using combined GSM with CSI-based FAPM.

In some exemplary embodiments, a CSI-based modulation scheme may transmit information bits by using a combined single RF chain GSM, RPM, and CSI-based GFAPM as shown in FIG. 5.

An exemplary transmitter procedure per channel use may include one or any combination of the following steps. A set of encoded bits may first be divided into four groups of varying size. A first group is an APM Group. The number of bits in the APM Group may depend on the conventional signal space modulation order. E.g., QPSK: $M_{APM}=4$. In case of more than one subcarriers are selected, different modulation (or modulation order may be used). A second group is an SSK Group. The number of bits in the SSK group may depend on the total number of transmit antennas. A third group is a GFAPM Group. The number of bits in the GFAPM Group may depend on the "effective" number of subcarriers after the diversity order and selection is done by the controller based on CSI. The "effective" number of subcarriers can then be written as:

$$N_{SC\_eff} = \left\lfloor \frac{N_{SC}}{N_{div}} \right\rfloor_{2\beta}$$

Based on CSI, a specific set of frequency subcarriers may be selected to provide best performance. For example, we may use a total of eight subcarriers, but allow the controller, based on CSI, to select the 'best' four for any given time instant. For this example, the following parameters may be used:

$N_{SC}=8$, $N_{div}=2$, resulting in $N_{sc\_eff}=4$.

A fourth group is an RPM Group. The number of bits in the RPM Group may depend on the number of radiation patterns and/or polarization modes that each antenna can generate, $N_{RP}$.

The APM bits may be mapped onto a signal space based modulation format. The FAPM bits may be mapped to a control signal indicating which of the subcarriers will be used for the current channel use. (Note that part of the subcarrier configuration may be used for diversity and is not used to transmit additional information bits.) The RPM bits may be mapped to a control signal(s) that selects the radiation pattern and/or polarization mode used for the current channel use. The APM symbol is modulated, mapped to the proper subcarriers(s), up converted to the RF domain, and sent through the Tx RF chain. The generated RF signal is mapped onto the active antennas. The antenna(s) are configured to radiate the signal based on the RPM bits. A bit mapping example is shown in Table 3.

An exemplary receiver procedure per channel use may include one or any combination of the following steps. After propagating through the channel, the signal arrives at the receiver carrying a unique spatial signature based on the selected antenna(s), frequency subcarrier(s), and the radiation pattern(s) used at the transmitter.

The signal can be demodulated and, using channel estimation, the bits can be detected based on receiver structures such as the ML or MMSE detectors. The SE can be written as follows:

$$SE = \log_2\left(\left\lfloor \binom{N_{TX}}{N_{TX\_act}} \right\rfloor_{2\beta}\right) +$$
$$\log_2(N_{RP}) + \log_2(\lfloor (N_{SC\_eff}) \rfloor_{2\beta}) + \log_2(M_{APM}) \text{ bpcu}$$

Where, $N_{TX}$ may indicate the total number of transmit antennas.

$N_{TX\_act}$ may indicate the number of active transmit antennas per channel use.

$N_{RP}$ may indicate the number of radiation patterns/polarization modes available for each antenna.

$N_{SC\_eff}$ may indicate the "effective" number of subcarriers available for information bearing.

$N_{SC\_act}$ may indicate the number of active subcarriers per channel use.

$M_{APM}$ may indicate the conventional signal space modulation order.

Note that for simplicity of illustration, the example above describes the use of FAPM instead of GFAPM. However, it is to be understood that the overall procedure is also applicable to GFAPM.

The foregoing embodiments use CSI-based modulation schemes using CSI to control one parameter at a time. Note, however that other embodiments may be generated from any combination of examples proposed above, e.g., using CSI to control multiple parameters.

TABLE 3

Mapping Example ($N_{TX} = 2$, $N_{SC} = 4$, $N_{div} = 2$, $N_{SC\_eff} = 2$
NRP = 2, MAPM = 2)

| SSK Bits: [$b_1$] | RPM Bits: [$b_2$] | APM Bits [$b_3$] (BPSK) | CSI-based 2 group Selection, [g] | FAPM Bits [$b_4$] | $X = [x_1, x_2]$ |
|---|---|---|---|---|---|
| [0] | [0] | [0] | [1] | [0], [1] | [$p_1 e^{j(2\pi f_1 + 0)}$, 0] |
| [0] | [0] | [0] | [1] | [1], [2] | [$p_1 e^{j(2\pi f_2 + 0)}$, 0] |
| [0] | [0] | [1] | [1] | [0], [1] | [$p_1 e^{j(2\pi f_1 + \pi)}$, 0] |
| [0] | [0] | [1] | [1] | [1], [2] | [$p_1 e^{j(2\pi f_2 + \pi)}$, 0] |
| [0] | [1] | [0] | [1] | [0], [1] | [$p_2 e^{j(2\pi f_1 + 0)}$, 0] |
| [0] | [1] | [0] | [1] | [1], [2] | [$p_2 e^{j(2\pi f_2 + 0)}$, 0] |
| [0] | [1] | [1] | [1] | [0], [1] | [$p_2 e^{j(2\pi f_1 + \pi)}$, 0] |

TABLE 3-continued

Mapping Example ($N_{TX}=2$, $N_{SC}=4$, $N_{div}=2$, $N_{SC\_eff}=2$ NRP = 2, MAPM = 2)

| SSK Bits: [$b_1$] | RPM Bits: [$b_2$] | APM Bits [$b_3$] (BPSK) | CSI-based 2 group Selection, [g] | FAPM Bits [$b_4$] | X = [$x_1$, $x_2$] |
|---|---|---|---|---|---|
| [0] | [1] | [1] | [1] | [1], [2] | [$p_2 e^{j(2\pi f_2 + \pi)}$, 0] |
| [1] | [0] | [0] | [1] | [0], [1] | [0, $p_1 e^{j(2\pi f_1 + 0)}$] |
| [1] | [0] | [0] | [1] | [1], [2] | [0, $p_1 e^{j(2\pi f_2 + 0)}$] |
| [1] | [0] | [1] | [1] | [0], [1] | [0, $p_1 e^{j(2\pi f_1 + \pi)}$] |
| [1] | [0] | [1] | [1] | [1], [2] | [0, $p_1 e^{j(2\pi f_2 + \pi)}$] |
| [1] | [1] | [0] | [1] | [0], [1] | [0, $p_2 e^{j(2\pi f_1 + 0)}$] |
| [1] | [1] | [0] | [1] | [1], [2] | [0, $p_2 e^{j(2\pi f_2 + 0)}$] |
| [1] | [1] | [1] | [1] | [0], [1] | [0, $p_2 e^{j(2\pi f_1 + \pi)}$] |
| [1] | [1] | [1] | [1] | [1], [2] | [0, $p_2 e^{j(2\pi f_2 + \pi)}$] |
| [0] | [0] | [0] | [2] | [0], [3] | [$p_1 e^{j(2\pi f_3 + 0)}$, 0] |
| [0] | [0] | [0] | [2] | [1], [4] | [$p_1 e^{j(2\pi f_4 + 0)}$, 0] |
| [0] | [0] | [1] | [2] | [0], [3] | [$p_1 e^{j(2\pi f_3 + \pi)}$, 0] |
| [0] | [0] | [1] | [2] | [1], [4] | [$p_1 e^{j(2\pi f_4 + \pi)}$, 0] |
| [0] | [1] | [0] | [2] | [0], [3] | [$p_2 e^{j(2\pi f_3 + 0)}$, 0] |
| [0] | [1] | [0] | [2] | [1], [4] | [$p_2 e^{j(2\pi f_4 + 0)}$, 0] |
| [0] | [1] | [1] | [2] | [0], [3] | [$p_2 e^{j(2\pi f_3 + \pi)}$, 0] |
| [0] | [1] | [1] | [2] | [1], [4] | [$p_2 e^{j(2\pi f_4 + \pi)}$, 0] |
| [1] | [0] | [0] | [2] | [0], [3] | [0, $p_1 e^{j(2\pi f_3 + 0)}$] |
| [1] | [0] | [0] | [2] | [1], [4] | [0, $p_1 e^{j(2\pi f_4 + 0)}$] |
| [1] | [0] | [1] | [2] | [0], [3] | [0, $p_1 e^{j(2\pi f_3 + \pi)}$] |
| [1] | [0] | [1] | [2] | [1], [4] | [0, $p_1 e^{j(2\pi f_4 + \pi)}$] |
| [1] | [1] | [0] | [2] | [0], [3] | [0, $p_2 e^{j(2\pi f_3 + 0)}$] |
| [1] | [1] | [0] | [2] | [1], [4] | [0, $p_2 e^{j(2\pi f_4 + 0)}$] |
| [1] | [1] | [1] | [2] | [0], [3] | [0, $p_2 e^{j(2\pi f_3 + \pi)}$] |
| [1] | [1] | [1] | [2] | [1], [4] | [0, $p_2 e^{j(2\pi f_4 + \pi)}$] |

Note:
$p_n$ represents the $n^{th}$ radiation pattern/polarization mode being selected.

Controlled Joint Modulation.

In some embodiments disclosed herein, controlled joint modulation is used to improve both information bearing and diversity capability by dynamic configuration. A controller that considers EE and/or SE and/or other metrics (e.g., reliability and latency) as optimizing criteria and allows for the configuration of a variety of modulation formats, such as signal amplitude, spatial, polarization, etc., is used in some embodiments. The number of active RF chains may also be a configuration parameter, allowing for a wide range of configurability for the dynamic needs of current and future applications. In various embodiments, the controller may comprise a module of either a transmitter device or a receiver device.

1. Controlled Joint Modulation

Figure 6A:
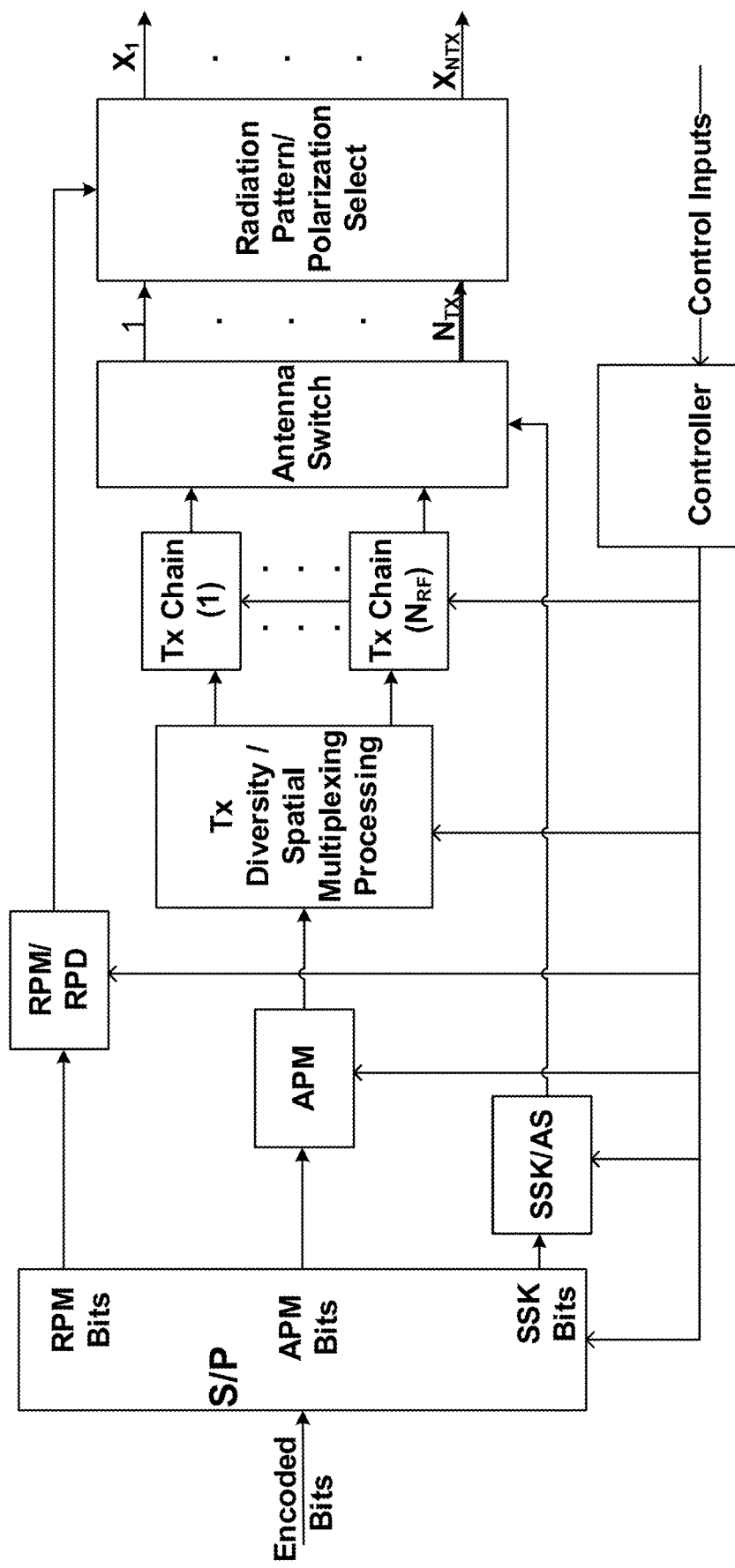
FIG. 6A is a functional block diagram of a transmitter using Controlled Joint Modulation.

A general description of the controlled joint modulation shown in FIG. 6A is as follows. A Serial To Parallel Converter (S/P) is provided. For each transmission, a serial stream of channel encoded bits are parallelized into three distinctive groups, according to the controller function. In an APM Group, the number of bits may depend on the conventional signal space modulation order as well as the MIMO technique being used, each of which is selected by the controller. In an RPM Group, the number of bits may depend on the number of radiation patterns and/or polarization modes utilized. Although there may be a maximum number of modes for an antenna, the controller determines which, if any, will be used at any time instant or time interval. In an SSK Group, the number of bits in this group may depend on the number of Tx antennas. There will be a fixed number of physical antennas; however, the controller will decide which ones will be utilized and for what purpose at any given time instant.

There may be different bit grouping methods for encoding. One method may be to treat and transmit all information bits equally by one or more coding groups. Another method may be based on the service requirements and characteristics (e.g., mission criticality and/or reliability) to accordingly select the particular coding groups mentioned above.

A Tx Diversity/Spatial Multiplexing Processing module may be provided. In the case of multiple Tx RF chains, which allows for SMX and/or transmit diversity (e.g., STBC), this module performs the necessary symbol processing.

A plurality of transmit chains (Tx Chains) may be provided. Each Tx chain may include various components, such as D/A, Up converter, PA, filters, etc. The number of active Tx chains at any given time instant may be selected by the controller.

An Antenna Switch may be provided. The Antenna Switch may map the incoming signals to the proper antennas according to the antennas selected for activation.

A Radiation Pattern/Polarization Select module may be provided to select the proper antenna pattern and/or polarization mode for each activate antenna.

A Controller may be provided. The Controller configures the overall transmission mode based on CSI and other possible measurements. For link adaptation, the transmission mode is based on CSI, which is either fed back from the receiver or a-priori known in TDD mode. The controller can use various criteria to select the proper mode, while aiming to balance the SE and EE at any given time instant. The different modes may be configured via the controller based on one or any combination of the following inputs:
  Channel state information (CSI).
    May be either long term or short term CSI.
  Channel Rank
    May indicate the number of spatial degrees of freedom available in the channel. Typically used to choose an appropriate SMX mode.
  Channel Quality per Transmit Antenna
    May be used to decide on how to best utilize the available antennas.
  The statistics of different modulation paths (e.g., RPM, APM, SSK, FAPM, TAPM, etc.).
    ACK/NACK of the transmitted bits over different modulation paths may be used to indicate the reliabilities of different modulation paths for the next transmission(s).
  SINR of a particular channel or a group of channels
    May be used to dynamically configure the parameters for transmission such as HARQ and different transmission mode, etc.

Block Error Rate (BLER)
  May be used to schedule different services with different modulation schemes.
SM Based Distance Metric
  May be used to decide the proper antennas and/or radiation pattern/polarization modes to utilize for the SSK and RPM portions.
Channel Coherence Time
  May be used determine how long various transmission mode selections can be relied on. E.g., fast switching on/off of Tx RF chains may not be desirable.
Data QoS
  This includes both data latency requirement and data error tolerant information
  The data latency requirement is used to determine if the data is time critical
  The data error tolerant information is used to determine how reliability the corresponding transmission needs.
Spectral Efficiency (Data Rate) Requirement
  May be used to aid in SE/EE tradeoff.
Remaining Battery Power
  May be used to aid in SE/EE tradeoff.
Energy Harvesting Capability
  RF energy harvesting may be used, especially for mMTC sensor nodes for example, and this may also be a factor used to aid in SE/EE tradeoff.

Using some combination of the above metrics (and possibly others), the controller may select the transmission mode. A great variety of transmission modes can be supported with the transmitter architecture shown in FIG. 6A. The modes may consist of a combination of APM, GSM, RPM, RPD, STBC, and SMX, or the like, and can be logically divided into single-transmit chain and multi-transmit chain modes. Generally, multi-transmit chain modes are less energy efficient and are reserved for when higher data rates are required. In addition, since the information bits may be grouped and modulated in different ways, they may need to be encoded jointly to achieve optimal performance. Also, based on the statistics of different modulation paths and the data QoS, the controller will select to weight the percentage of data to be sent over each modulation path. For example, if the APM modulated data is more reliably transmitted than the RPM modulated data, the controller will put more data with high QoS requirements on the APM modulation path.

Figure 6B:
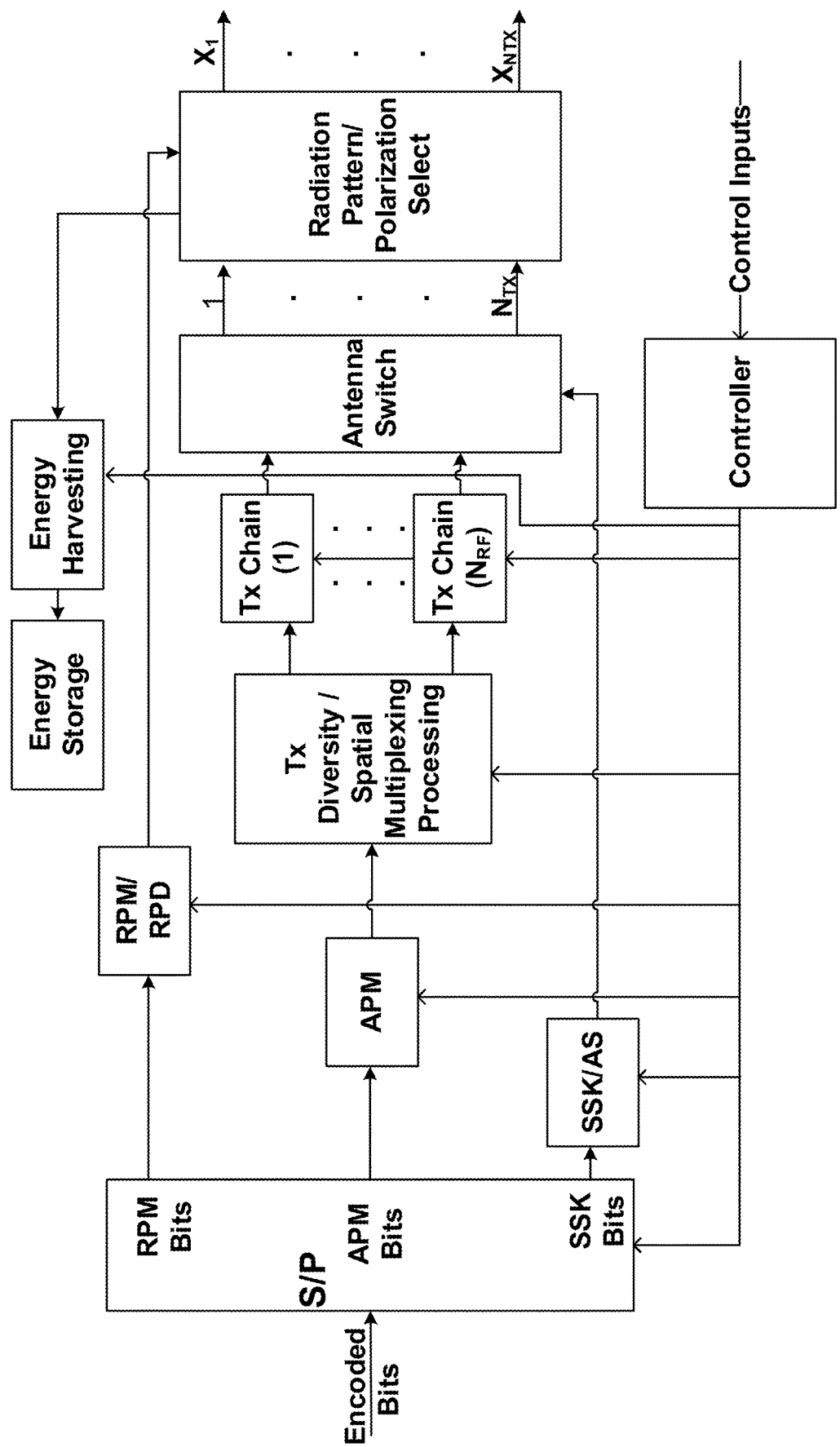
FIG. 6B is a functional block diagram of the transmitter using Controlled Joint Modulation, further using energy harvesting and storage.

In some embodiments, such as in FIG. 6B, Energy Harvesting and Storage modules may be provided such that RF energy can be harvested and stored from unused antennas to increase battery life and hence overall energy efficiency of the said device. This component is especially useful for mMTC use cases where significantly extended battery life is advantageous.

It should be noted that in some embodiments, the controller may be part of a receiver device, which may determine and then signal back to the transmitter the desired transmission mode for a given period.

Figure 7:
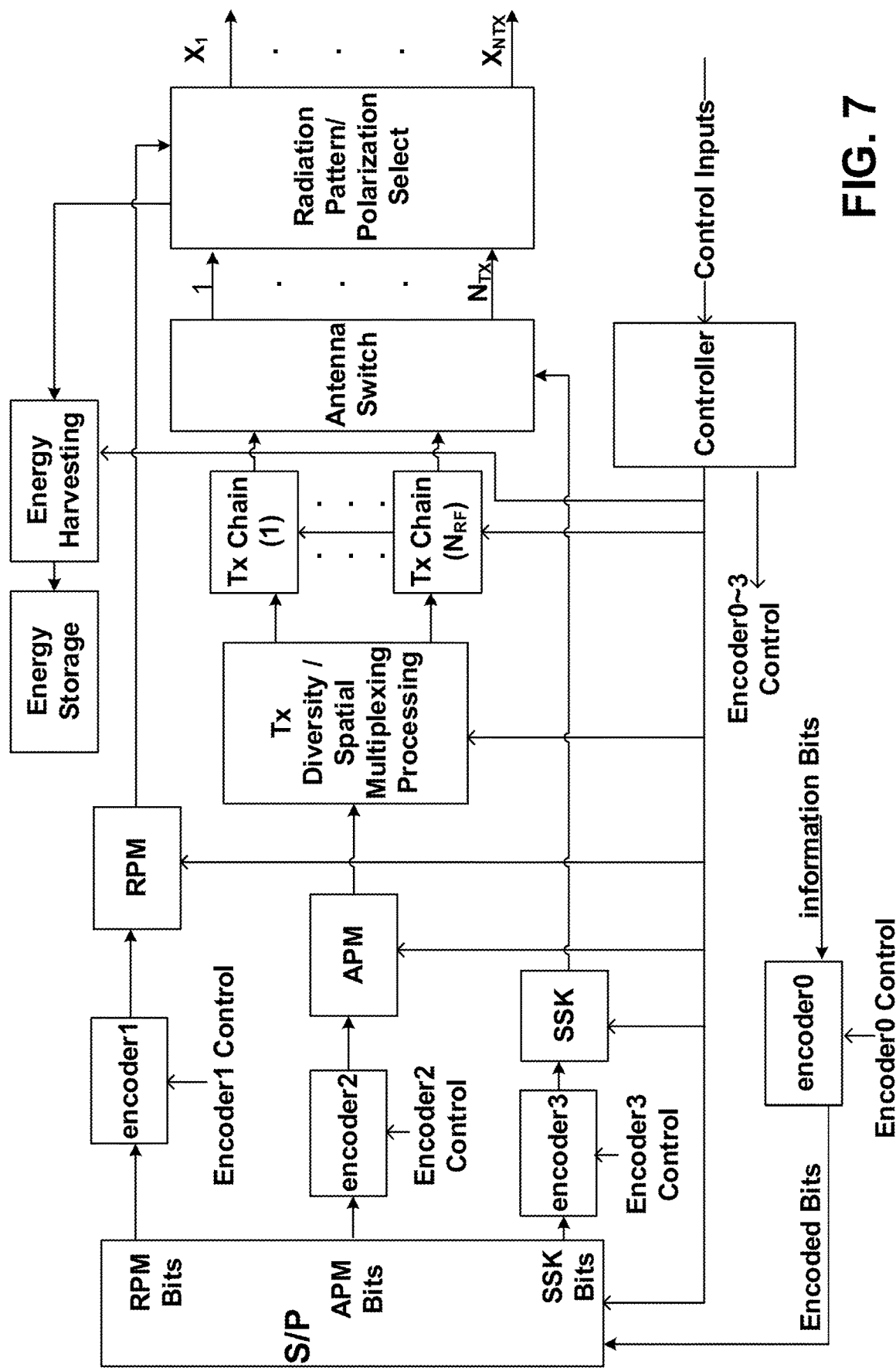
FIG. 7 is a functional block diagram of a transmitter using Controlled Joint Modulation with different channel encoders.

Another example implementation is illustrated in FIG. 7. All information bits may be coded using a single encoder (encoder0) or different encoders (encoder 1~3) for bits being processed via different modulation schemes (e.g., RPM, APM, and SSK). The system may benefit from the latter approach since the probability of errors for different modulation schemes could be drastically different. Note that the types of those encoders could be different and, even if the types are the same, the parameters (e.g., coding rate) could also be different. The enable/disable, types and parameters of those encoders can be determined by the controller. In addition, all encoders (encoder 0~3) may all be enabled at the same time for more reliable performance.

Figure 8:
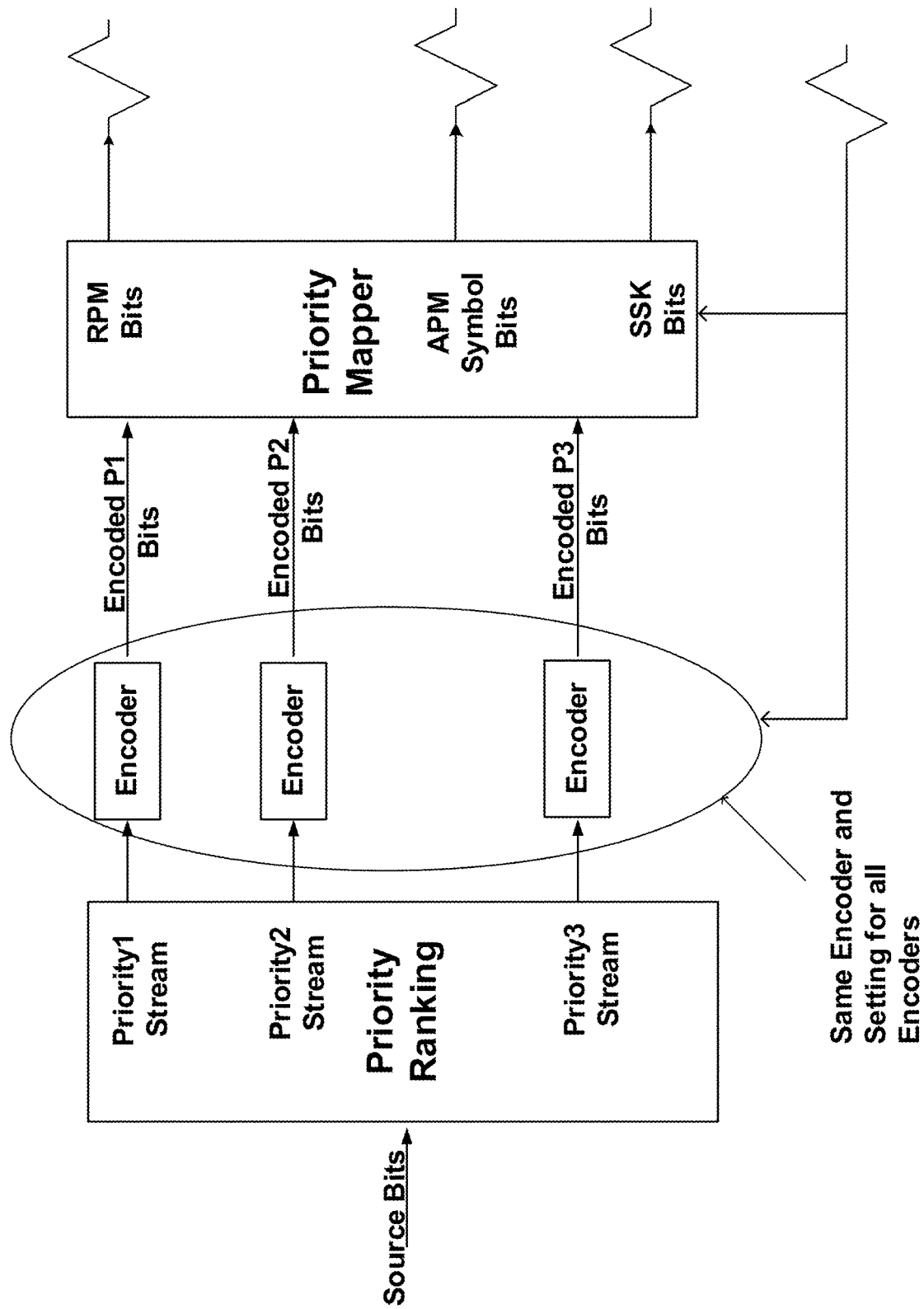
FIG. 8 is a functional block diagram of a transmitter using Controlled Joint Modulation with prioritized source bits.
Figure 8:
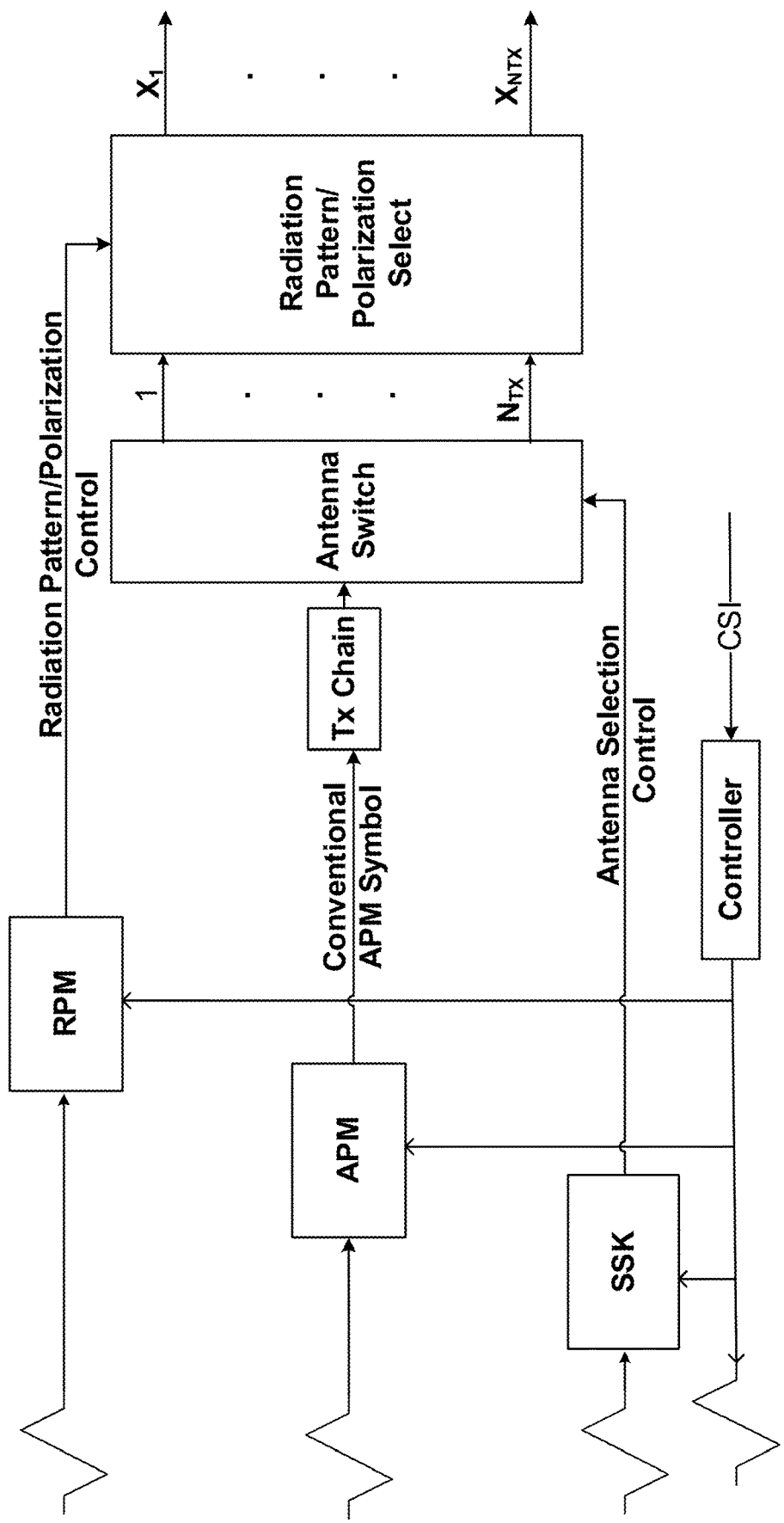

An implementation of another embodiment is illustrated in FIG. 8. Unlike conventional signal space modulation where the constellation points are fixed according to the type of modulation (e.g., BPSK, QPSK, etc.), the other spatial and/or antenna based modulation schemes do not have a fixed constellation. For example, the constellation points of an SSK modulator are based mainly on the channel characteristics. Because of this the bits being transmitted on the different dimensions used for the multi-dimensional modulation scheme may experience different performance.

On the other hand, there exist cases where the source bits have different priorities, e.g., Most Significant Bits (MSBs) and Least Significant Bits (LSBs). The prioritized source bits can be connected to the different performance of the multi-dimensional modulation schemes. As FIG. 8 shows, the source bits may be priority encoded to three different data streams. Once this is done, each data stream can be sent to the same channel encoder, which may also be instantiated three times as shown assuming latency is an issue (in other embodiments, a plurality of encoders may be used). The next module shown in FIG. 8 is referred to as a Priority Mapper. This module operates to map the prioritized bit streams to the proper modulation dimension based on the controller. The controller may update this mapping decision based on its CSI based inputs. In other embodiments, more or fewer priority levels may be utilized.

2. Optimal Controller for Joint Modulation

In another exemplary embodiment, an optimal controller may be proposed for joint modulation. An example implementation of an optimal controller may be proposed by first discussing controllers used in conventional schemes.

Consider a conventional controller for Tx Diversity Gains. In conventional transmit antenna selection (or reconfigurable antenna pattern selection), the desire may be to transmit data using a single antenna (or pattern) out of the available antennas (or patterns). A possible algorithm to choose the antenna (pattern) to use may be to measure the SINR at the Rx for each Tx antenna (pattern) during a training period; the Rx may then select the antenna (pattern) index with the maximum SINR and signal to the Tx to use that index for the subsequent data transmission.

Consider a conventional controller for SM-MIMO. In conventional SM-MIMO with link adaptation, the desire may be to choose a subset of the available antennas (patterns) to use as information bearing entities. A possible algorithm to choose this subset may be to choose the subset that maximizes the minimum distance between constellation points. The minimum distance between the spatial constellation points (conventional distance metric) may be measured at the Rx for all combinations of antennas (patterns) during a training phase. The Rx may then select the subset that provides the maximum minimum distance metric and signal to the Tx to use that subset for subsequent data transmission.

An example optimum controller for the joint modulator being proposed may be as follows. During a training phase the following procedure may occur. Measurement of the SINR at the Rx for each Tx antenna and radiation pattern and ranking of those measurements. Computation of a channel based distance metric at the Rx for all possible antenna and radiation pattern subsets. Jointly optimizing and ranking the transmission mode choices based on the two main short term channel based criteria above. Additional channel and requirements based metrics (e.g., channel rank, channel coherence time, transmit time requirement, etc.) to further reduce the potential transmission mode candidates may also be used. Even further, including additional energy efficiency based metrics (e.g., remaining battery power, energy harvesting capability, etc.) to again reduce the candidate transmission modes may also be used. Subsequently, choosing the most energy efficient transmission mode that can be used to meet the requirements given the current short term and long term channel characteristics.

3. Signaling to Support Controlled Joint Modulation

In a further exemplary embodiment, various schemes and/or procedures may be employed for joint modulation to signal how the bits are controlled and/or configured among transmitter components to receiver for demodulation.

Transmission Mode for Controlled Joint Modulation.

FIG. 6A is a functional block diagram of an exemplary controlled joint modulation transmitter, which can be configured to operate in a variety of different transmit modes. In various embodiments, the transmitter can be configured to perform the following:

Generalized spatial modulation (GSM)
Radiation Pattern/Polarization Modulation (RPM)
Radiation Pattern/Polarization Diversity (RPD)
Space Time Block Coding (STBC)
Spatial Multiplexing (SMX)
Frequency domain modulation (FAPM)
Generalized Frequency domain modulation (GFAPM)
Time domain modulation (TAPM)
Generalized Time domain modulation (GTAPM)
Some combination of the above Besides transmission mode, other control information may include following:

The number of bits used for each component
The frequency subcarriers involved in the joint modulation
The time units involved in the joint modulation
The transmitter and receiver's capability (e.g., the number of supported antenna patterns)

Signaling the Controller Information for Joint Modulation.

Signal transmission mode and/or other control information defined above may use one or any combination of the following methods. In a first method, the transmitter (or BS's) antenna pattern capability information is put in certain existing or new SIB. The UE's antenna pattern capability is sent to BS in the initial registration procedure and/or in the RRC connection setup procedure. Furthermore, the BS or network may send the UE capability enquiry to the UE, which replies with the UE capability information containing its antenna pattern capability, in the RRC IE (Information Element). In a second method, transmission mode and/or other control information may be signaled in the associated control channel or PHY header. In a third method, transmission mode and/or other control information may be signaled in a semi-persistent approach. In another embodiment, the transmission mode and/or other control information may be signaled in a fully dynamic approach. In a fourth method, other control information may be implicitly signaled.

In some embodiments, the signaling of the controller information may occur from the receiver to the transmitter, such as where the controller is a module of a receiver device.

Although the solutions described herein consider 5G specific protocols, it is understood that the solutions described herein are not restricted to this scenario and are applicable to other wireless systems as well.

ADDITIONAL EMBODIMENTS

In an embodiment, there is a method comprising: receiving as input a set of encoded bits; dividing the set of encoded bits into at least three groups, wherein at least one group is size limited by a diversity order and selection factor applied by a channel state information (CSI) controller; mapping the first group to a signal space based modulation format; mapping the second group to a control signal for antenna selection; mapping the third group to a control signal for controlling antenna configuration; generating a modulated RF signal based on the mapping of the first group; selecting at least one configurable antenna of a plurality of configurable antennas for transmission based on the mapping of the second group; configuring the at least one configurable antenna based on the mapping of the third group; and transmitting the modulated RF signal through the at least one configured antenna. In one embodiment, the third group is bit limited by a subset of antenna configurations of all possible antenna configurations based on the CSI controller applying the diversity order and selection. In one embodiment, the second group is bit limited by a subset of antennas of all possible antennas based on the CSI controller applying the diversity order and selection. In one embodiment, the set of encoded bits is divided into four groups, wherein the fourth group is bit limited by a subset of frequency subcarriers of all possible frequency subcarriers, and the fourth group is mapped to a control signal indicating which of the subset of frequency subcarriers will be used for the current channel use.

In an embodiment, there is a method comprising: utilizing a serial to parallel converter to parallelize a serial stream of channel encoded bits into a plurality of distinctive groups according to a controller function; configuring an overall transmission mode with the controller, wherein the controller may evaluate one or more inputs to select one or more modes; mapping a first group to a signal space based modulation format; mapping a second group to a control signal for antenna selection; mapping a third group to a control signal for controlling antenna configuration; generating a modulated RF signal based on the mapping of the first group; selecting at least one configurable antenna of a plurality of configurable antennas for transmission based on the mapping of the second group; configuring the at least one configurable antenna based on the mapping of the third group; and transmitting the modulated RF signal through the at least one configured antenna. In one embodiment, the evaluated inputs for the controller comprise at least one of: channel state information; channel rank; channel quality per transmit antenna; statistics of at least one modulation path; SINR of a particular channel or group of channels; block error rate; SM based distance metric; channel coherence time; data QoS; spectral efficiency requirement; remaining battery power; energy harvesting capability. In one embodiment, CSI may comprise long term or short term CSI. In one embodiment, data QoS may comprise data latency requirements and data error tolerant information. In one embodiment, the controller selected transmission mode balances the SE and EE at any given time instant. In one embodiment, the method further comprises harvesting and storing RF energy from unused antennas. In one embodiment, the method further comprises a fourth group, wherein the fourth group is bit limited by a subset of frequency subcarriers of all possible frequency subcarriers, and the fourth group is mapped to a control signal indicating which of the subset of frequency subcarriers will be used for the current channel use. In one embodiment, the controller further controls the transmission mode by utilizing diversity schemes. In one embodiment, the diversity scheme comprises space time block coding or space frequency block coding. In one embodiment, the diversity scheme comprises utilizing spatial multiplexing. In one embodiment, the diversity scheme comprises utilizing radiation patterns or polarization modes of an antenna. In one embodiment, the controller selects a single-transmit chain mode. In one embodiment, the controller selects a multi-transmit chain mode. In one embodiment, a bit grouping method for encoding may treat and transmit all information bits equally by one or more coding groups. In one embodiment, a bit grouping method for encoding may treat and transmit information bits based on a service requirement or characteristic, to accordingly select the particular coding groups. In one embodiment, the method further comprises encoding each group of bits using a single encoder. In one embodiment, the method further comprises encoding each group of bits with a different encoder. In one embodiment, the method further comprises encoding the groups of bits with a plurality of different encoders. In one embodiment, the method further comprises priority encoding the groups of bits.

In an embodiment, there is a method of training a controller for a joint modulator, comprising: measuring at a receiver an SINR for each transmitter antenna and radiation pattern; ranking said antennas and radiation patterns; computing a channel based distance metric at the receiver for all possible antenna and radiation pattern subsets; jointly optimizing and ranking the transmission mode choices based on SINR and the distance metric; and signaling the controller with the optimized and ranked transmission mode choices. In one embodiment, the method further comprises computing and optimizing/ranking at least one additional metric from the group consisting of: channel rank; channel quality per transmit antenna; statistics of at least one modulation path; SINR of a particular channel or group of channels; block error rate; SM based distance metric; channel coherence time; data QoS; spectral efficiency requirement; remaining battery power; energy harvesting capability; transmit time requirement. In one embodiment, the at least one additional metric reduces the number of potential transmission mode candidates.

In an embodiment, there is a method of demodulating a received signal, comprising: receiving at a receiver a signal carrying a spatial signature from one or more selected antennas as well as a diversity encoding that was applied at the transmitter simultaneously in the time and frequency; and demodulating the signal and using channel estimation to detect the bits based on receiver structures. In one embodiment, the received signal is demodulated using an ML or MMSE approach.

In an embodiment, there is a method of signaling to support controlled joint modulation, comprising: transmitting, from a transmitter to a receiver, antenna pattern capability information of the transmitter. In one embodiment, the transmitter antenna pattern capability information is conveyed in new or existing SIB. In one embodiment, the method further comprises requesting, from the transmitter, antenna pattern capabilities of the receiver. In one embodiment, the antenna pattern capability information may be signaled in an associated control channel or PHY header. In one embodiment, the antenna pattern capability information may be signaled in a semi-persistent approach. In one embodiment, the antenna pattern capability information may be implicitly signaled. In one embodiment, the method further comprises transmitting control information from the transmitter to the receiver. In one embodiment, the control information comprises at least of the group consisting of: a number of bits used for each component; which frequency subcarriers are involved in the joint modulation; which time units are involved in the joint modulation; how many antenna patterns are supported.

In an embodiment, there is a method of controlled joint modulation, comprising: receiving at least one operating condition parameter at a joint modulation controller; configuring a plurality of modulators and transmit modes based on the at least one operating condition parameter; mapping a set of information bits to a plurality of modulation dimensions of the configured plurality of modulators; and performing symbol processing based on at least one configured transmit mode. In one embodiment, the at least one operating condition parameter is selected from the group consisting of: channel based operational parameters; service requirement based operational parameters; and internal state based operational parameters. In one embodiment, channel based operational parameters comprise at least one of channel state information or an SM-based distance metric. In one embodiment, service requirement based operational parameters comprise at least one of data quality of service or block error rate. In one embodiment, internal state based operational parameters comprise at least one of remaining battery power or number of available RF chains. In one embodiment, the plurality of modulators and transmit modes are selected from the group consisting of: Generalized Spatial Modulation; Radiation Pattern/Polarization Modulation; Radiation Pattern/Polarization Diversity; Space Time Block Coding; Spatial Multiplexing; Frequency Domain Modulation; Generalized Frequency Domain Modulation; Time Domain Modulation; and Generalized Time Domain Modulation.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method comprising:
   a joint modulation controller of a transmitter receiving at least one operating condition parameter of the transmitter, channel state information, and channel rank information;
   the joint modulation controller determining at least one diversity order and antenna selection factor based on the received at least one operating condition parameter;

receiving as input at the transmitter a set of information bits;

dividing the set of information bits into a plurality of groups, wherein at least one group is either a signal space keying group or a radiation pattern/polarization group having size limited by the diversity order determined by the joint modulation controller;

mapping a first group to a plurality of signal space based modulation formats;

mapping the at least one group and each other group to a control signal for a configurable feature of a transmitter system;

generating and modulating a plurality of base signals according to the mapping of the first group onto the modulation format, each of the plurality of base signals generated by a selected number of transmit radio frequency chains using spatial multiplexing, the selected number of transmit radio frequency chains being based on the channel rank information;

configuring at least one configurable feature of a configurable antenna of the transmitter system based on the control signal; and transmitting the modulated signal from the configured at least one configurable antenna.

2. The method of claim 1, further comprising the joint modulation controller, based on the received at least one operating condition parameter, selecting a bit grouping method that treats all information bits equally by one or more coding groups.

3. The method of claim 1, further comprising the joint modulation controller, based on the received at least one operating condition parameter, selecting a bit grouping method that treats information bits differently by selected particular coding groups.

4. The method of claim 1, further comprising the joint modulation controller, based on the received at least one operating condition parameter, selecting a single encoder to encode all of the groups of bits.

5. The method of claim 1, further comprising the joint modulation controller, based on the received at least one operating condition parameter, selecting a plurality of encoders to encode the groups of bits, wherein at least one group is encoded with a first encoder and at least one group is encoded with a second encoder.

6. The method of claim 1, further comprising, wherein each of the groups of bits are priority encoded into a plurality of prioritized data streams, the joint modulation controller allocating each of the plurality of prioritized data streams to a modulation dimension of the transmitter based on the received at least one operating condition parameter and the priority of each data stream.

7. The method of claim 1, wherein one of the plurality of groups is size limited to a number of configurations in a subset of antenna configurations of all possible antenna configurations, the subset based on the joint modulation controller applying the diversity order and selection.

8. The method of claim 1, wherein one of the plurality of groups is size limited to a number of antennas in a subset of antennas of all possible antennas, the subset based on the joint modulation controller applying the diversity order and selection.

9. The method of claim 1, wherein one of the plurality of groups is size limited to a number of frequency subcarriers in a subset of frequency subcarriers of all possible frequency subcarriers, the subset based on the joint modulation controller applying the diversity order and selection.

10. The method of claim 1, wherein the at least one operating condition parameter comprises a spectral efficiency requirement.

11. The method of claim 1, wherein the at least one operating condition parameter comprises a spectral modulation based distance metric.

12. The method of claim 1, wherein the at least one operating condition parameter comprises channel coherence time.

13. The method of claim 1, wherein the determined at least one diversity order and selection factor configures a plurality of modulators and transmit modes based on the at least one operating condition parameter to reduce a number of potential transmission mode candidates based on the at least one operating condition parameter.

14. A system comprising a processor and a non-transitory storage medium storing instructions operative, when executed on the processor, to perform functions including:

receiving at least one operating condition parameter of a transmitter system, channel state information, and channel rank information;

determining at least one diversity order and antenna selection factor based on the received channel state information and at least one operating condition parameter;

receiving as input at the transmitter system a set of information bits;

dividing the set of information bits into a plurality of groups, wherein at least one group is either a signal space keying group or a radiation pattern/polarization group having a size limited by the determined diversity order;

mapping a first group to a plurality of signal space based modulation formats;

mapping the at least one group and each other group to a control signal for a configurable feature of the transmitter system;

generating and modulating a plurality of base signals according to the mapping of the first group onto the modulation format, each of the plurality of base signals generated by a selected number of transmit radio frequency chains using spatial multiplexing, the selected number of transmit radio frequency chains being based on the channel rank information;

configuring at least one configurable feature of a configurable antenna of the transmitter system based on the control signal; and transmitting the modulated signal from the configured at least one configurable antenna.

* * * * *